(12) United States Patent
Zhang et al.

(10) Patent No.: US 10,027,223 B1
(45) Date of Patent: Jul. 17, 2018

(54) SOFT-CHARGING OF SWITCHED CAPACITORS IN POWER CONVERTER CIRCUITS

(71) Applicant: Linear Technology Holding LLC, Norwood, MA (US)

(72) Inventors: Jindong Zhang, Fremont, CA (US); Jian Li, San Jose, CA (US)

(73) Assignee: Linear Technology Holding LLC, Norwood, MA (US)

( * ) Notice: Subject to any disclaimer, the term of this patent is extended or adjusted under 35 U.S.C. 154(b) by 0 days.

(21) Appl. No.: 15/713,348

(22) Filed: Sep. 22, 2017

Related U.S. Application Data

(60) Provisional application No. 62/518,338, filed on Jun. 12, 2017.

(51) Int. Cl.
  *H02M 1/36* (2007.01)
  *H02M 3/07* (2006.01)

(52) U.S. Cl.
  CPC .................................... *H02M 3/07* (2013.01)

(58) Field of Classification Search
  CPC ..... H02M 1/36; H02M 3/07; H02M 2003/072
  USPC ................................ 307/110; 363/49, 60, 62
  See application file for complete search history.

(56) References Cited

U.S. PATENT DOCUMENTS

| | | | |
|---|---|---|---|
| 6,154,375 A | 11/2000 | Majid et al. | |
| 7,078,883 B2 | 7/2006 | Chapman et al. | |
| 7,742,318 B2 | 6/2010 | Fu et al. | |
| 8,503,203 B1* | 8/2013 | Szczeszynski | H02M 3/073 307/110 |
| 2003/0001552 A1* | 1/2003 | Fujita | H02M 3/07 323/288 |
| 2009/0189586 A1* | 7/2009 | Tiew | H02M 1/36 323/288 |
| 2009/0322384 A1* | 12/2009 | Oraw | H02M 3/07 327/112 |
| 2011/0309809 A1 | 12/2011 | Rao et al. | |
| 2012/0112724 A1* | 5/2012 | Nishida | H02M 3/07 323/293 |

(Continued)

OTHER PUBLICATIONS

International Search Report and Written Opinion from PCT/US2017/046797, dated Nov. 2, 2017, 10 pages.

(Continued)

*Primary Examiner* — Jeffrey Gblende
(74) *Attorney, Agent, or Firm* — McDermott Will & Emery LLP

(57) ABSTRACT

A switched capacitor power converter includes multiple switching transistors in a default switching path, and an auxiliary soft-charge bypass circuit which includes one or more auxiliary transistors and an impedance element, and provides an auxiliary circuit path through the auxiliary transistor(s) to charge a plurality of capacitors within the converter circuit when the auxiliary soft-charge bypass circuit is activated and at least one of the switching transistors is deactivated. A corresponding control circuit switches the converter circuit from a soft-charging mode in which the auxiliary soft-charge bypass circuit is activated and a switching transistor is deactivated, to an operational mode in which the auxiliary soft-charge bypass circuit is deactivated, the control circuit periodically switching the one or more auxiliary transistors during the soft-charging mode in place of the deactivated switching transistor(s).

20 Claims, 25 Drawing Sheets

(56) References Cited

U.S. PATENT DOCUMENTS

| | | |
|---|---|---|
| 2013/0201726 A1 | 8/2013 | Hu et al. |
| 2014/0021916 A1 | 1/2014 | Bilezikjian et al. |
| 2014/0210393 A1* | 7/2014 | Kanekawa ............ B60R 21/017 |
| | | 318/494 |
| 2014/0254208 A1 | 9/2014 | Dai et al. |
| 2014/0266099 A1* | 9/2014 | Ku ......................... H02M 1/36 |
| | | 323/273 |
| 2015/0008894 A1* | 1/2015 | Cannankurichi ....... H02M 1/36 |
| | | 323/282 |
| 2015/0084404 A1 | 3/2015 | Hashim et al. |
| 2015/0155895 A1* | 6/2015 | Perreault .............. H04B 1/0458 |
| | | 455/127.3 |
| 2015/0207401 A1* | 7/2015 | Zhang .................. H02M 3/158 |
| | | 323/271 |
| 2015/0270775 A1* | 9/2015 | Ma ......................... H02M 1/36 |
| | | 330/296 |
| 2015/0318794 A1 | 11/2015 | Hansson |
| 2016/0261185 A1 | 9/2016 | Lidsky et al. |
| 2017/0085177 A1 | 3/2017 | Jimenez Pino et al. |
| 2017/0353105 A1* | 12/2017 | Solie ....................... H02M 3/07 |
| 2018/0006550 A1 | 1/2018 | Kao |

OTHER PUBLICATIONS

"PhotoMOS for Various Applications," Automation Controls, Industrial Devices, Panasonic, downloaded Dec. 22, 2017, 7 pages, Panasonic Corporation, https://www3.panasonic.biz/ac/e/control/relay/photomos/app_circuits/index.jsp.

* cited by examiner

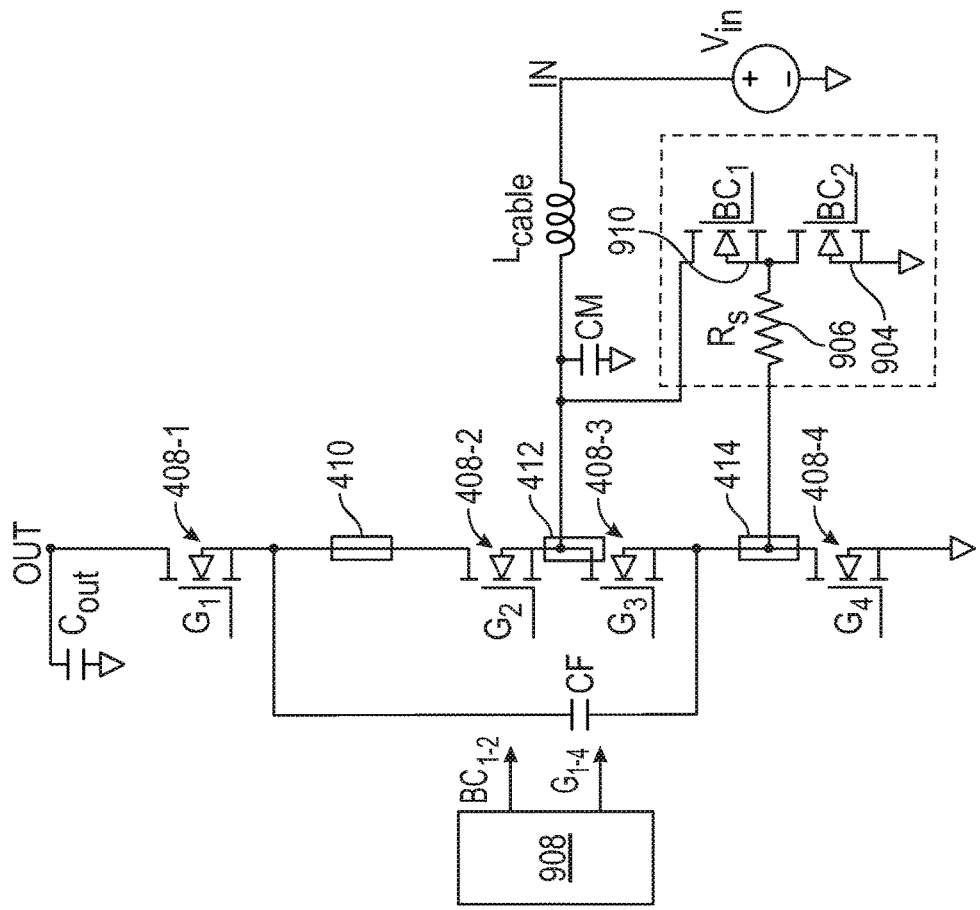
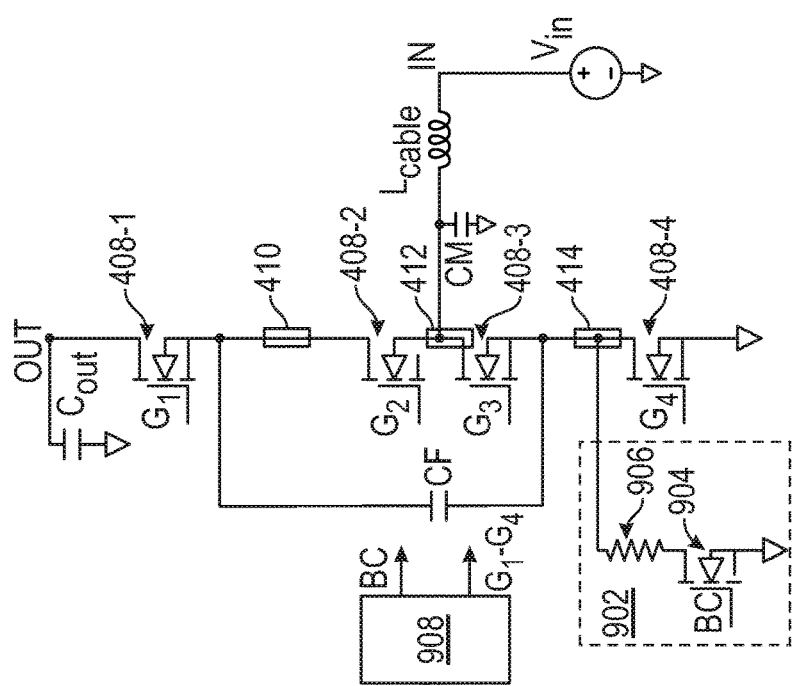
FIG. 9B
FIG. 9A

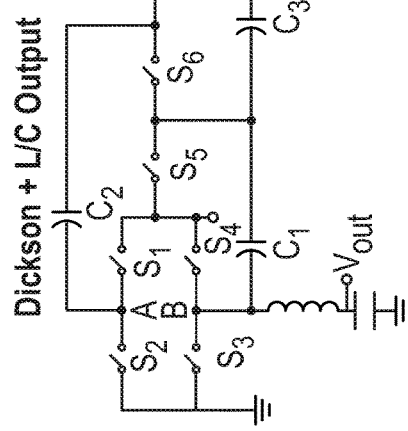
FIG. 13A Ladder + L/C Output
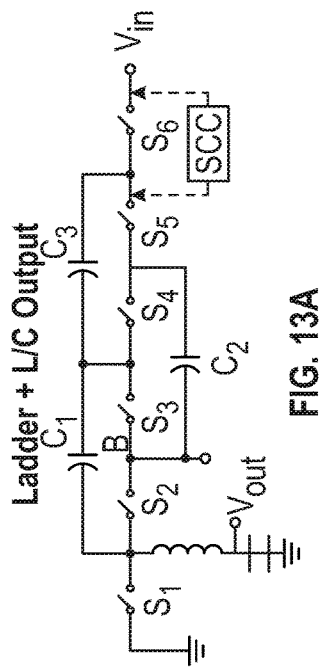
FIG. 13C Fibonacci + L/C Output
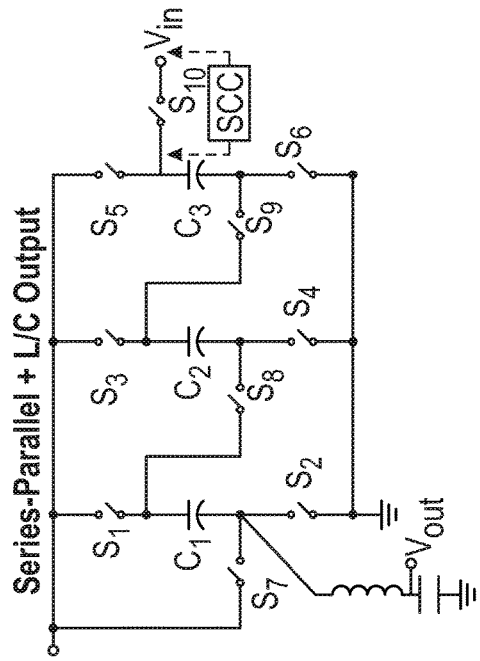
FIG. 13B Dickson + L/C Output
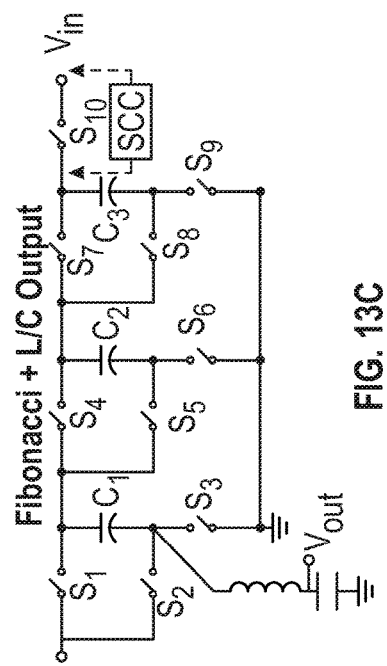
FIG. 13D Series-Parallel + L/C Output
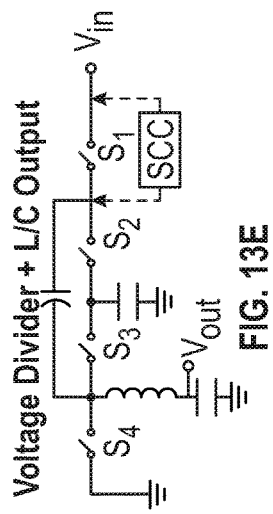
FIG. 13E Voltage Divider + L/C Output

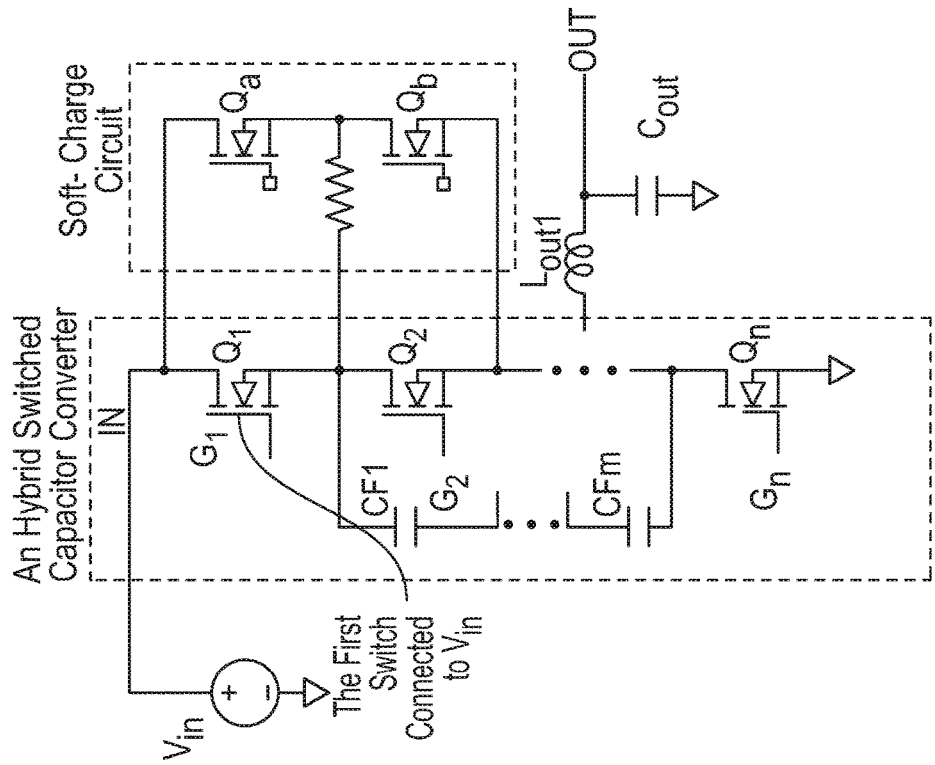
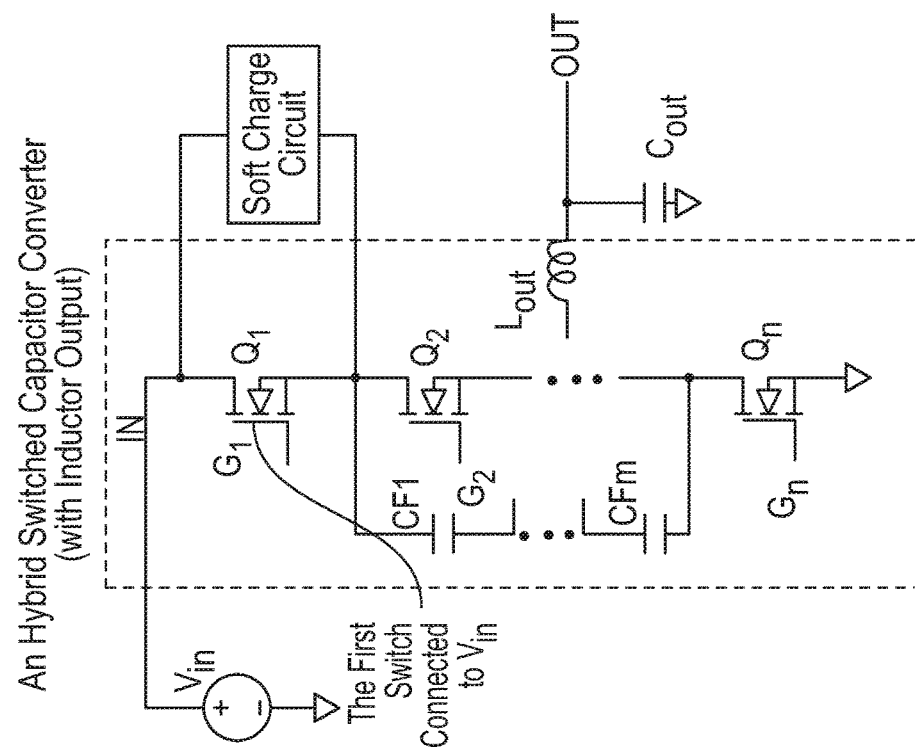
FIG. 14A
FIG. 14B

SOFT-CHARGING OF SWITCHED CAPACITORS IN POWER CONVERTER CIRCUITS

CROSS-REFERENCE TO RELATED APPLICATIONS

This application claims the benefit of priority under 35 U.S.C. § 119 from U.S. Provisional Patent Application Ser. No. 62/518,338, entitled "Apparatus And Method For Soft-Charging Switched Capacitors In Power Converter Circuits," filed Jun. 12, 2017, and is related to U.S. patent application Ser. No. 15/675,632, entitled "Soft-Start Circuit For Switched Resonant Power Converters," filed Aug. 11, 2017, the disclosures of which are hereby incorporated by reference in their entirety for all purposes.

FIELD OF THE DISCLOSURE

The disclosure relates generally to switched capacitor devices and, more particularly, to start up charging of such capacitor devices in switching power converter circuits.

BACKGROUND

Switched capacitor DC-DC converters can be a useful and advantageous alternative to inductor-based DC-DC converters. Advantages of switched capacitor DC-DC converters can include far lower electro-magnetic induction (EMI) noise, lower component height, smaller device volume, higher operating efficiency and higher power density. A shortcoming of switched capacitor DC-DC converters is that flying capacitors and load capacitors therein can draw, during power up or fast input voltage transient, high in-rush currents through one or more switched charging transistors. Such currents can exhibit magnitudes that can shorten the average life of the switched charging transistors or damage the transistors.

One technique to reduce in-rush current in switching circuits includes inserting one or more dedicated current sources within the switched capacitor DC-DC converter to provide, upon start up, a direct feed of pre-charging currents to flying and output capacitors before the main switching transistors are turned on. One disadvantage of this technique may include a long duration pre-charge time due to large output capacitors, practical limits on the size of the current source switching transistors, or both. Also, the switched DC-DC converter may not be able to deliver a sufficient load current during pre-charging of the capacitors.

Another technique used to reduce in-rush current in switching circuits includes adding a "hot-swap" input converter to convert step increases in input voltage (e.g., a step produced at power-up) to a slow ramp-up voltage. This technique requires an additional input series power transistor with high safe-operating-area and of a large size. As a result, a hot swap input converter can add significant conduction loss, and can occupy significant board real estate with high solution cost.

Accordingly, what is needed is a mechanism for effectively limiting in-rush current across switching transistors during power up or fast input voltage transients, without adding considerable power loss, solution size, cost and complexity.

SUMMARY OF THE DISCLOSURE

A switched capacitor power converter includes multiple switching transistors in a default switching path, and an auxiliary soft-charge bypass circuit which includes one or more auxiliary transistors and an impedance element, and provides an auxiliary circuit path through the auxiliary transistor(s) to charge a plurality of capacitors within the converter circuit when the auxiliary soft-charge bypass circuit is activated and at least one of the switching transistors is deactivated. A corresponding control circuit switches the converter circuit from a soft-charging mode in which the auxiliary soft-charge bypass circuit is activated and a switching transistor is deactivated, to an operational mode in which the auxiliary soft-charge bypass circuit is deactivated, the control circuit periodically switching the one or more auxiliary transistors during the soft-charging mode in place of the deactivated switching transistor(s).

A switched capacitor power converter according to various embodiments includes a plurality of capacitors and a plurality of switching transistors arranged to, when switched (e.g., on and off) according to a switching cycle, charge the plurality of capacitors from a voltage source and discharge the plurality of capacitors to provide regulated power to a load. The switched power converter includes an auxiliary soft-charge bypass circuit. The auxiliary soft-charge bypass circuit includes one or more auxiliary transistors and an impedance element, and provides an auxiliary circuit path parallel to a first switching transistor of the plurality of switching transistors through the impedance element to charge the plurality of capacitors when the auxiliary soft-charge bypass circuit is activated and the first switching transistor is deactivated. The switched capacitor power converter may also include a control circuit configured to switch from (1) a soft-charging mode in which the auxiliary soft-charge bypass circuit is activated and the first switching transistor is deactivated, to (2) an operational mode in which the auxiliary soft-charge bypass circuit is deactivated, and the one or more auxiliary transistors are switched (e.g., by the control circuit) according to the switching cycle in place of one or more of the plurality of switching transistors.

In some embodiments, a system includes a power supply comprising a switched capacitor power converter. The switched capacitor power converter may include a plurality of capacitors in a first circuit, a first plurality of switching transistors in the first circuit which, when activated, connects the plurality of capacitors in series, a second plurality of switching transistors arranged in the first circuit which, when activated, connects the plurality of capacitors in parallel, wherein a first switching transistor of the first plurality of switching transistors or a second switching transistor of the second plurality of switching transistors, when activated, provides a default circuit path to at least one of the plurality of capacitors, an auxiliary soft-charge bypass circuit comprising an impedance element and providing, when activated, an alternative path through the impedance element to the at least one of the plurality of capacitors, and a control circuit configured to switch between (1) a soft-charging mode in which the alternative path is periodically activated while the default switching path is deactivated, and (2) an operational mode in which the default switching path is periodically activated while the alternative path is deactivated, to charge the plurality of capacitors from a voltage source and discharge the plurality of capacitors to provide regulated power to a load.

In some embodiments, a switched capacitor power converter includes means for establishing a default switching path between a voltage source and a load, to provide regulated power to the load based on a switching cycle, means for providing an auxiliary switching path through an impedance element, parallel to a portion of the default switching path, to charge one or more capacitors in the default switching path based on the switching cycle, and means for switching between a soft-charging mode in which the auxiliary switching path is enabled and the default switching path is disabled, and an operational mode in which the auxiliary switching path is disabled and the default switching path is enabled, the auxiliary switching path being enabled in response to a power-up of the converter or to a fast input voltage transient from the voltage source, and the default switching path being switched to enabled when charge on the one or more capacitors reaches a threshold charge.

Other aspects disclosed herein include corresponding methods, systems, apparatuses, and electronic device products for implementation of a switched capacitor power converter that includes an auxiliary soft-charge bypass circuit. It is understood that other configurations will become readily apparent to those skilled in the art from the following detailed description, wherein various exemplary configurations and implementations are shown and described by way of illustration.

BRIEF DESCRIPTION OF THE DRAWINGS

The accompanying drawings are presented to aid in the description of example aspects and are provided solely for illustration of embodiments and not limitation thereof.

FIG. 2A depicts operation of the circuit during initial power up. FIG. 2B depicts operation of the circuit after the start up period.

FIGS. 9A and 9B are diagrams illustrating exemplary implementations of a soft-charging switched capacitor step up converter, including an auxiliary bypass soft-charging circuit.

FIG. 12A illustrates an exemplary switched capacitor Dickson type converter circuit utilizing a multiple switching transistor bypass soft-charging circuit. FIG. 12B illustrates an exemplary resonant-type Dickson converter circuit utilizing a multiple switching transistor bypass soft-charging circuit.

FIGS. 13A to 13E are diagrams of exemplary implementations of ladder type, Dickson type, Fibonacci type, series-parallel type and voltage divider type switched capacitor converters with modified L/C output.

FIGS. 14A and 14B are diagrams of an auxiliary bypass soft-charging circuit being utilized in a higher n-order soft-charging switched capacitor hybrid converter circuit with an inductor output.

DETAILED DESCRIPTION

Figure 2A:
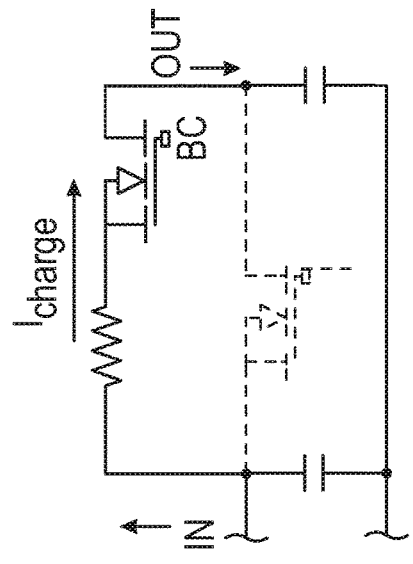
FIGS. 2A and 2B illustrate respective circuit paths of two exemplary operating modes of the circuit of FIG. 1.

Aspects and features, and exemplary implementations practices and applications are disclosed in the following description and related drawings. Alternatives to disclosed examples may be devised without departing from the scope of disclosed concepts.

The term "converter," as used herein, encompasses but is not limited to any one of, or any combination of "regulator," "DC regulator," "voltage regulator," "DC voltage regulator," "DC-DC converter," "DC converter" and "converter," and includes but is not limited to anything within the plain meaning of any one or more of these terms, as of the earliest priority date of this application.

Various exemplary systems described herein include a soft-charging switched capacitor power converter circuit, with at least one switching main transistor between an input terminal and an output terminal and an auxiliary soft-charge bypass circuit parallel to a main switching transistor. In various implementations, an input capacitor can be coupled from the input terminal to ground, and an output capacitor may be coupled from the output terminal to ground. The auxiliary soft-charge bypass circuit can be switchable between an "on" state and an "off" state by a switching control circuit. In this regard, the switching control circuit can provide one or more transistor control signals to the main switching transistor(s) and one or more precharge control signals to the auxiliary soft-charge bypass circuit.

The switching control circuit can be configured to set the transistor control signal(s) to a disabled state upon power down. The switching control circuit can be further configured to detect or receive indication of the power-up of the soft-charging switched capacitor converter or a fast input voltage transient and, in response, to switch the precharge control signal to the "on" state while maintaining the transistor control signal(s) in the disabled state. When the power up voltage arrives at the input terminal, the auxiliary soft-charge bypass circuit, being in its "on" state, provides an enabled path parallel to one or more disabled main switching transistors for a precharge current to flow from the input terminal to the output capacitor connected at the output terminal. The switching control circuit can be configured to maintain the auxiliary soft-charge bypass circuit in its "on" state and the main switching transistor(s) in the disabled state for a duration that enables a given precharging of the output capacitor, and to then switch the auxiliary soft-charge bypass circuit off and initiate main switching transistor operation to charge the output capacitor.

The above-described converter and its described operations can provide, among other features and benefits, a technical solution to the previously described high in-rush current problem. At power-up, instead of the main switching transistor(s) being initially coupled to a fully discharged output capacitor, and therefore having to carry the resulting in-rush current, the main switching transistor(s) is disabled until the auxiliary soft-charge bypass circuit has sufficiently precharged the output capacitor. Thus, stress on the main switching transistor(s) and on the capacitor(s) from a large in-rush current is reduced or avoided.

In one or more implementations, examples of which will be described in greater detail, a main switching transistor can be a first switching transistor in a switching network of a switched capacitor DC-DC converter that includes multiple switched capacitors. The switching network can include a second switching transistor connected in series with the first switching transistor. The auxiliary soft-charge bypass circuit and the first switching transistor can be connected in parallel between an input terminal and the second switching transistor.

At power up, the switching control circuit can enable a soft-charging mode in which the auxiliary soft-charge bypass circuit is enabled while the first switching transistor is disabled. In the soft-charging mode, the converter circuit is configured so that a pre-charging current flows—with a magnitude controlled by the auxiliary soft-charge bypass circuit—from the input terminal, through the auxiliary soft-charge bypass circuit, through the second switching transistor and into the switching network to suitably precharge the capacitors. The switching control circuit can then enable an operational mode in which the auxiliary soft-charge bypass circuit is disabled, and an operational switching state of the switching network, including the first switching transistor, is enabled.

Figure 1:
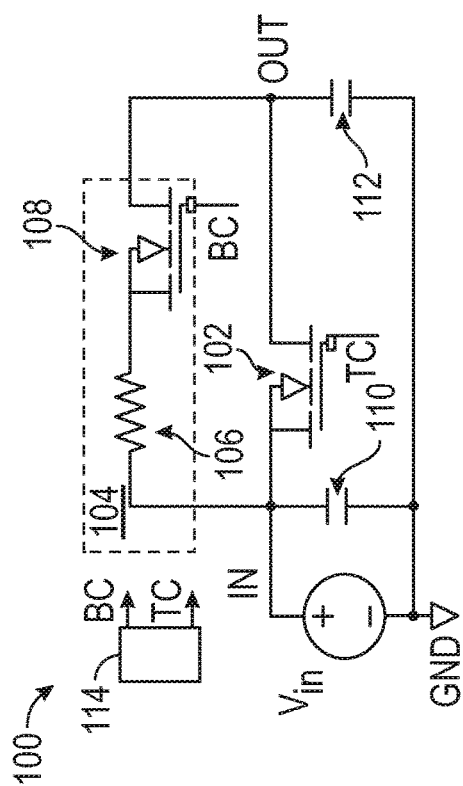
FIG. 1 is a diagram of an exemplary soft-charging circuit.

FIG. 1 illustrates an exemplary implementation of a soft-charging circuit 100. The soft-charging circuit 100 can include a main switching transistor 102, connected between a voltage input terminal IN and a charged output terminal OUT, and can include an auxiliary soft-charge bypass circuit 104, connected between the IN and OUT terminals in parallel with the main switching transistor 102. The auxiliary soft-charge bypass circuit 104 can be implemented, for example, as a current limiting resistor 106 in series with an auxiliary transistor 108. An input capacitor 110 can be coupled between the IN terminal and local ground GND, and an output capacitor 112 can be coupled between the OUT terminal and GND.

The main switching transistor 102 and the auxiliary soft-charge bypass circuit 104 can receive, for example, from a switching control circuit 114, a respective transistor control signal, arbitrarily labeled "TC," and a bypass control signal, arbitrarily labeled "BC." One or more of the described functions of the switching control circuit 114 can be implemented, for example by distributed hardware devices, e.g., metal traces and logic gates (not visible in FIG. 1).

The main switching transistor 102, when activated (e.g., by the application of TC), provides a first circuit path between the IN terminal and the OUT terminal, to provide regulated power to a load in conjunction with the output capacitor 112 connected to the OUT terminal. The auxiliary soft-charge bypass circuit 104, when the auxiliary transistor 108 is activated and the main switching transistor 102 is deactivated, provides a second circuit path, parallel to the first circuit path between the IN terminal and the OUT terminal, to charge the output capacitor 112.

The switching control circuit 114 can switch TC to a "transistor disable" state, for example, to deactivate main switching transistor 102 in response to a given trigger event (e.g., a power-down or power-up event, or in response to a fast input voltage transient), and maintain that transistor disable state until lapse of a given time, or detection of a pre-charge complete event (e.g., charge on the output capacitor reaching a given voltage). Concurrently with maintaining the main transistor disable state, the switching control circuit 114 can switch BC to a "precharge enable" state, for example, to activate auxiliary soft-charge bypass circuit 104 in response to detection or notification of a power-up input transient, and maintain the precharge enable state until detection or notification, for example, of a pre-charge completion.

The switching control circuit 114 being configured as described establishes a first converter state, at power up, in which the main switching transistor 102 is in its deactivated state and the auxiliary soft-charge bypass circuit 104 is in its activated state. When an input voltage from a voltage source Vin arrives at the IN terminal, the auxiliary soft-charge bypass circuit 104, being in its activated state, provides a circuit path, parallel to the disabled main switching transistor 102, for a precharge current (not visible in FIG. 1) to flow from the IN terminal to the output capacitor 112 coupled at the OUT terminal.

The switching control circuit 114 can be configured to maintain TC in the transistor disable state and BC in the precharge enable state until a given duration of time has lapsed since the precharge commenced, or until detection or notification of a given voltage (e.g., at the OUT terminal and/or capacitor 112) or other precharge complete event. The switching control circuit 114 can be configured to then switch to a second converter state in which the auxiliary soft-charge bypass circuit 104 is deactivated and the main switching transistor 102 is activated. In this regard, BC is switched to a precharge disable state and TC is switched to a transistor enable state. In response, the auxiliary soft-charge bypass circuit 104 switches off, and the main switching transistor 102 can initiate switching transistor operation to power the output load in conjunction with charging the output capacitor 112.

Figure 2B:
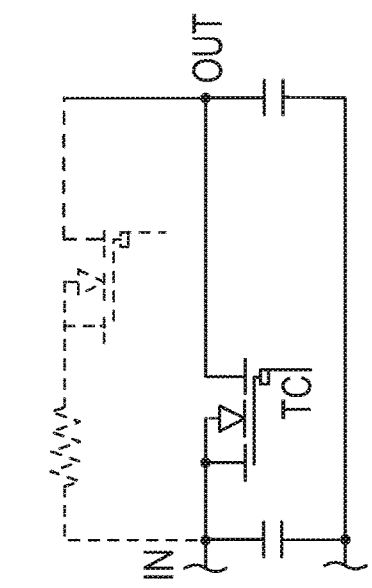

FIGS. 2A and 2B illustrate exemplary component states and current flows associated with above-described power down and power up of the FIG. 1 soft-charging circuit 100. Item numbers are omitted for visibility. The dotted line graphics of FIG. 2A represent the switching transistor 102 in its deactivated state, and the solid line graphics of FIG. 2A represent the auxiliary soft-charge bypass circuit 104 in its activated state. Assuming Vin at the IN terminal, a precharge current Icharge flows through the auxiliary soft-charge bypass circuit 104 to the output capacitor. The solid line graphics of FIG. 2B represent the switching transistor 102 in an activated state, and the dotted line graphics of FIG. 2B represent the auxiliary soft-charge bypass circuit 104 in a deactivated state.

Figure 3:
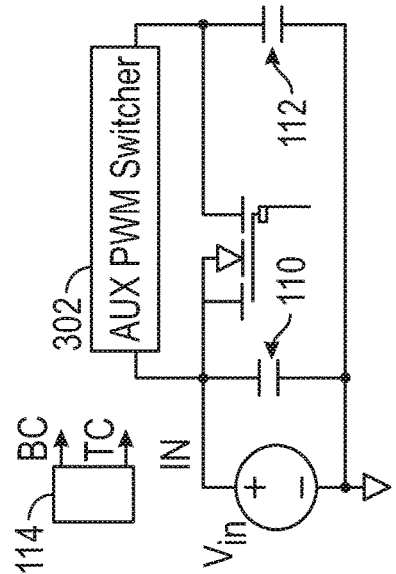
FIG. 3 is a diagram of an exemplary soft-charging circuit implementing an auxiliary pulse width modulation switcher.

FIG. 3 is a diagram illustrating a pulse width modulation (PWM) auxiliary bypass 302 implementation of the auxiliary soft-charge bypass circuit 104. In one or more implementations, the switching control circuit 114 is configured to provide the BC precharge enable state as a PWM signal. The PWM BC signals can be identical to the PWM TC signal provided to the corresponding main switching transistor(s).

Figure 4:
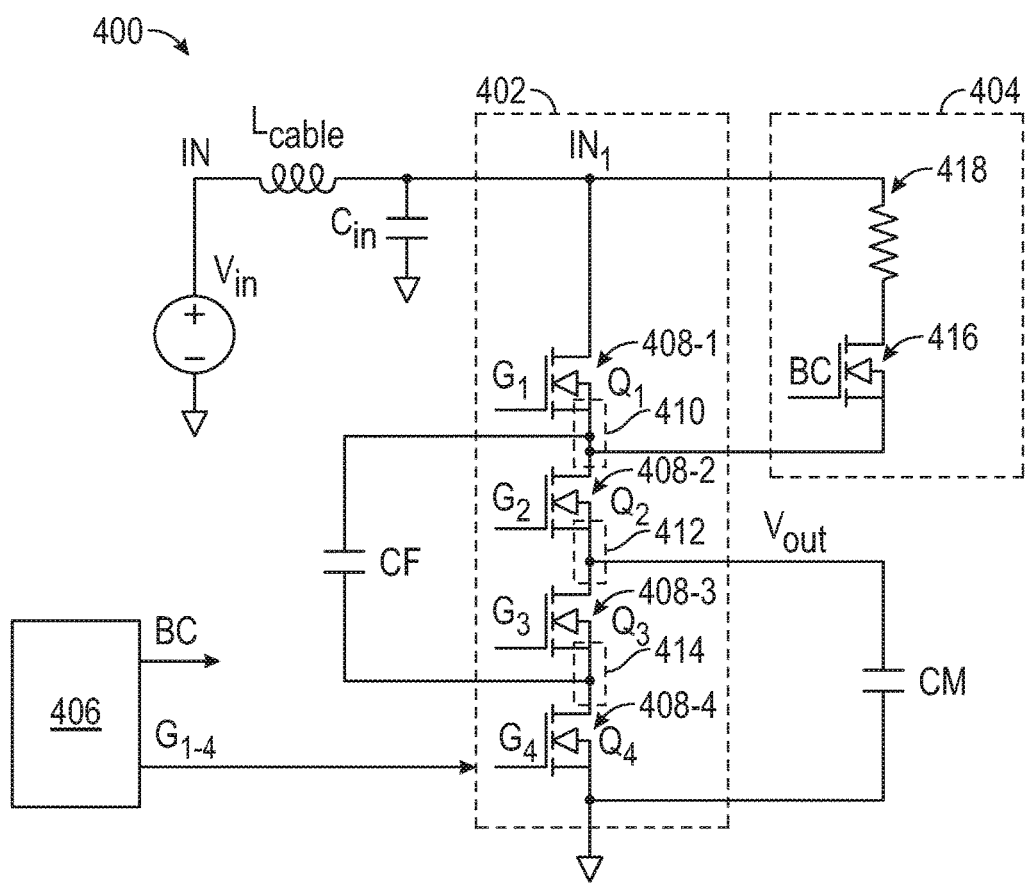
FIG. 4 is a diagram of an exemplary soft-charging switched capacitor converter, including an auxiliary bypass soft-charging circuit.

FIG. 4 is a diagram illustrating an exemplary implementation of an soft-charging switched capacitor converter 400. For brevity in description, an arbitrary abbreviation, "SCSC," will used herein as an alternative form for the word string "soft-charging switched capacitor."

One or more components of the SCSC converter 400 can include a main switching bridge circuit 402, a number of capacitors, and an auxiliary bypass circuit 404. In the depicted example, the switching bridge circuit 402 is configured to receive switching control signals G1-4 and one or more bypass control signals BC, respectively, from a soft-charging switching control circuit 406. According to various implementations, switching control circuit 406 can be configured to switch control signals G1-4 on and off (e.g., according to a switching cycle). The switching bridge circuit 402 can be structured as a series connection of switched transistors, including a first switching transistor 408-1, second switching transistor 408-2, third switching transistor 408-3, and fourth switching transistor 408-4. The switching transistors 408-1, 408-2, 408-3, and 408-4 (referenced as collectively "switching transistors 408") have respective gates (visible but no separately numbered) that receive the switching control signals G1, G2, G3, and G4, respectively.

The circuit of exemplary converter 400 can operate as a step down-converter circuit. A voltage source Vin provides a voltage source at terminal IN. In some implementations, Lcable represents the parasitic input cable or PCB trace inductance between the input supply Vin and input capacitor Cin at terminal IN1. The first switching transistor 408-1 can be connected between IN1 and a first node 410. The second switching transistor 408-2 can connect between the first node 410 and a second node 412. The third switching transistor 408-3 can connect between the second node 412 and a third node 414, and the fourth switching transistor 408-4 can be connected between the third node 414 and a local ground. A flying capacitor CF can couple between the first node 410 and the third node 414, and an output buffer capacitor CM can couple between the second node 412 and the local ground. In this regard, the switching transistors 408 are arranged to, when switched (e.g., on and off according to a switching cycle), charge the capacitors from a voltage source Vin, and discharge the capacitors to provide regulated power to a load connected, for example, at Vout.

The auxiliary bypass circuit 404 is arranged parallel to the switching transistor 408-1 and includes an transistor 416 and an impedance element 418. In this manner, the auxiliary bypass circuit 404 provides an auxiliary circuit path through the impedance element 418 to charge the capacitors when the auxiliary soft-charge bypass circuit is activated and the switching transistor 408-1 is deactivated. Impedance element 418 can be implemented, for example, as a limiting resistor in series with the transistor 416. In one or more implementations, the auxiliary bypass circuit 404 can be implemented as a PWM controlled element, such as the PWM auxiliary bypass 302 of FIG. 3.

In various implementations, the soft-charging switching control circuit 406 can be configured to generate signals G1, G2, G3, and G4 according to a default switching cycle. According to various implementations, the switching cycle may include periodically switching first switching transistor 408-1 and third switching transistor 408-3 to the "on" state, while at the same time periodically switching second transistor 408-2 and fourth switching transistor 408-4 to the complimentary "off" state, and then vice versa. In the depicted example, this switching cycle places CF and CM in series between Vin and ground when the first and third switching transistors are switched ON and the second and fourth switching transistors are switched off, and places CF and CM in parallel when the second and fourth switching transistors are switched ON and the first and third switching transistors are switched off.

Control circuit 406 can also be configured to switch between a soft-charging mode (e.g., during power up or a fast Vin transient) in which the auxiliary bypass circuit 404 is activated and the switching transistor 408-1 is deactivated, and a steady state operational mode (e.g., after the transient is over) in which the auxiliary bypass circuit 404 is deactivated and the switching transistor 408-1 is activated. The soft-charging mode can include, for example, placing the first switching transistor control signal G1 in a transistor disable state, and generating BC, G2, G3, and G4 at respective transistor enabling and switching states according to the switching cycle, with BC being generated in place of G1. The steady state operational mode can include disabling BC and generating G1, G2, G3, and G4 with respective PWM parameters and timings. In both examples, the switching bridge circuit 402 (with or without BC) switches interconnection of the flying capacitor CF and buffer capacitor CM in accordance with the switching cycle of the switched capacitor converter.

The soft-charging switching control circuit 406 can also be configured to place G1 at the transistor disable state in response to a power down of the SCSC converter 400 and to maintain G1 at the transistor disable state during a power up of the SCSC converter 400. SCSC converter 400 is held at the transistor disable state through the soft-charging mode until switched by the switching control circuit 406 to the steady state operational mode.

Accordingly, in an exemplary operation, at power up of the SCSC converter 400 the first switching transistor 408-1 is in a disabled state and the auxiliary bypass circuit 404 is in an enabled state. Upon the power up, the soft-charging switching control circuit 406 maintains G1 at the transistor disable state while enabling switching of BC with G2, G3, and G4 according to the switching cycle of the converter. Since the auxiliary bypass circuit 404, second switching transistor 408-2, third switching transistor 408-3, and fourth switching transistor 408-4 are enabled, receipt of a voltage source Vin at the IN terminal causes a device precharge current (not visible in FIG. 4) to flow from the IN terminal, through the enabled auxiliary bypass circuit 404, to the first node 410 and to the flying capacitor CF and the output capacitor CM. In this regard, the capacitor(s) CF and/or CM is placed in series with resistor 418, between Vin and ground, and G2, G3, and G4 are switched according to a charging cycle to soft charge the capacitor(s).

The soft-charging switching control circuit 406 can be configured to maintain the SCSC converter in the soft-charging power up mode until lapse of a given time since switching to that mode, or until detection or notification of a precharge complete event when the output voltage on capacitor CM (or CF) reaches a desired level. The switching control circuit 406 can then switch to the steady state operational mode, where it disables BC, and generates G1, G2, G3, and G4 signals with respective PWM parameters and timings. In this regard, the switching bridge circuit 402 switches interconnection of the flying capacitor CF and buffer capacitor CM to, for example, provide a divided voltage from the voltage source at the Vout terminal.

Figure 5A:
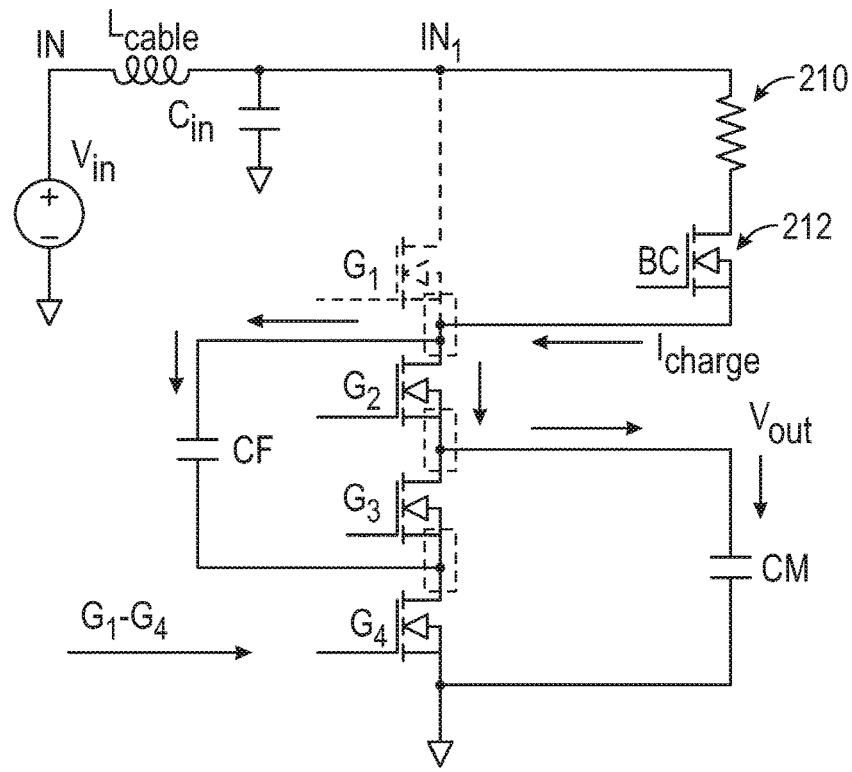
FIGS. 5A and 5B illustrate respective circuit paths of exemplary operating modes associated with the circuit of FIG. 4.
Figure 5B:
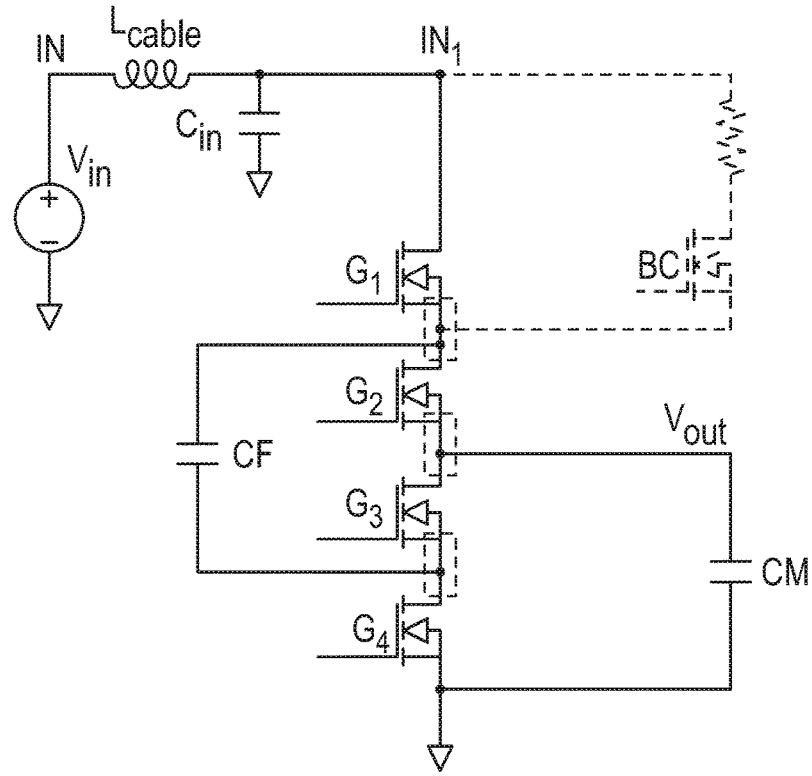

FIGS. 5A and 5B illustrate respectively, a soft-charging power up mode operation and a steady state operational mode operation of the SCSC converter 400. Some items numbers are omitted for visibility. With reference to FIG. 5A, the dotted line graphics for the first switching transistor 408-1 represent its disabled state, and the solid line graphics for the auxiliary bypass circuit 404 represent its enabled state. Assuming Vin at the IN1 terminal, the above-described device precharge current, labeled in FIG. 5A as "Icharge," flows from the IN1 terminal, through the enabled auxiliary bypass circuit 404, to the first node 410. This Icharge current is limited by the series resistor 210, to soft-charge the capacitor CF and CM with BC, G2, G3 and G4 signals switching under PWM operation. FIG. 5B depicts the circuit in the operational state after the output voltage on CM reaches its desired level. In the depicted example, when CM is close to Vin/2, the auxiliary bypass signal BC is disabled and the main switch signal G1 is enabled. Once the main switch signal G1 is enabled, the converter current flows through the main switch. The converter can then operate according to its default switching cycle. Because the auxiliary bypass circuit has much higher resistance, some overlap between BC and G1 signal may be tolerated after CM voltage reaches its desired level.

Figure 6:
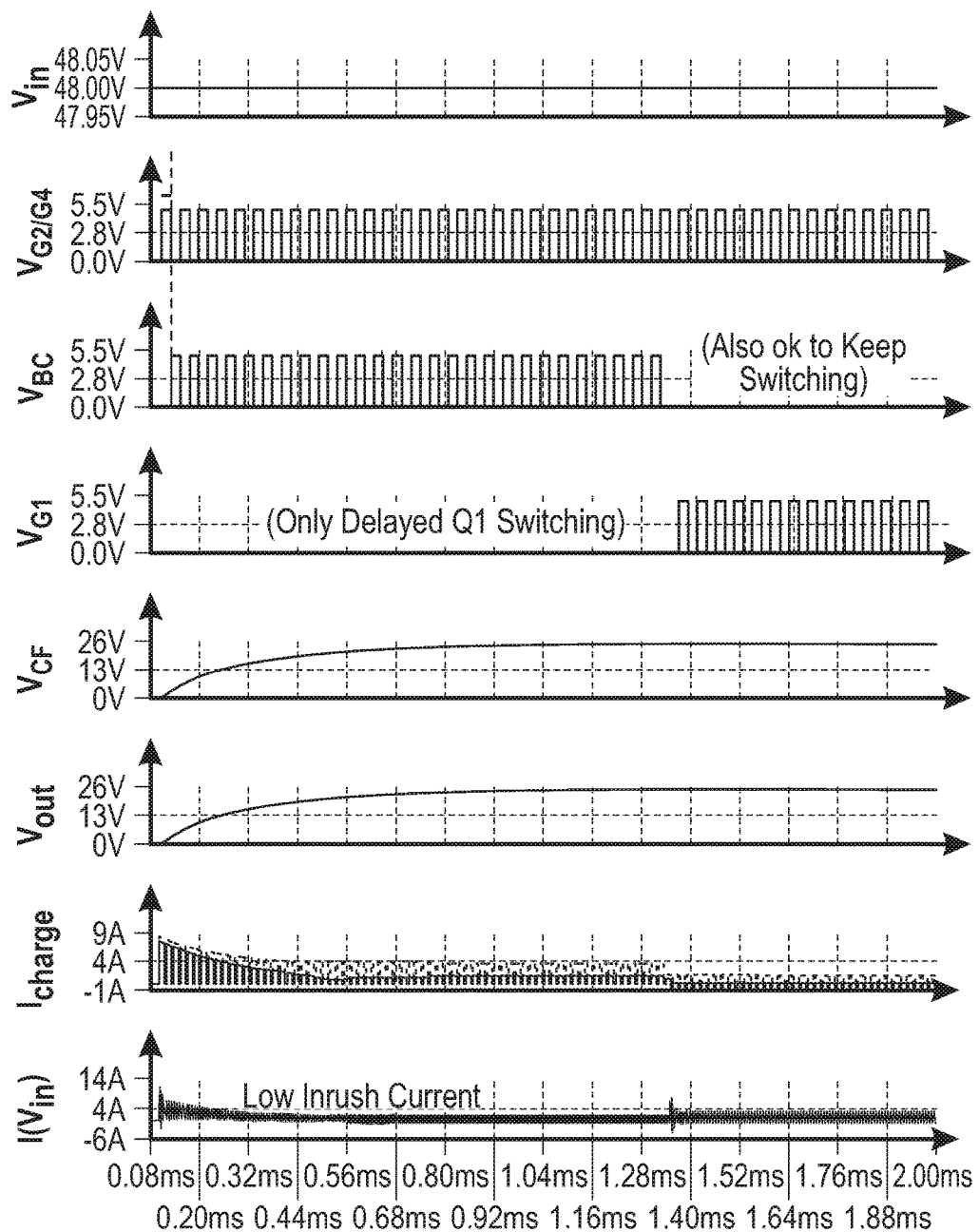
FIG. 6 illustrates first exemplary control signals and results obtained in a first simulation applying the control signals to a model of the exemplary soft-charging switched capacitor converter shown by FIG. 4.

FIG. 6 illustrates first exemplary control signals and results obtained in a first simulation applying the control signals to a model of the exemplary SCSC converter 400 shown by FIG. 4. The depicted examples show the CF capacitor voltage (Vcf) and CM capacitor voltage (Vout) are charged up softly according to the sequence described with respect to FIGS. 5A and 5B. The charging current (Icharge) is controlled with peak value less than 9 A. The input in-rush current (I(Vin)) is limited within a desired tolerance. In the depicted case, BC is a PWM enable pulse during soft-charging time period.

Figure 7:
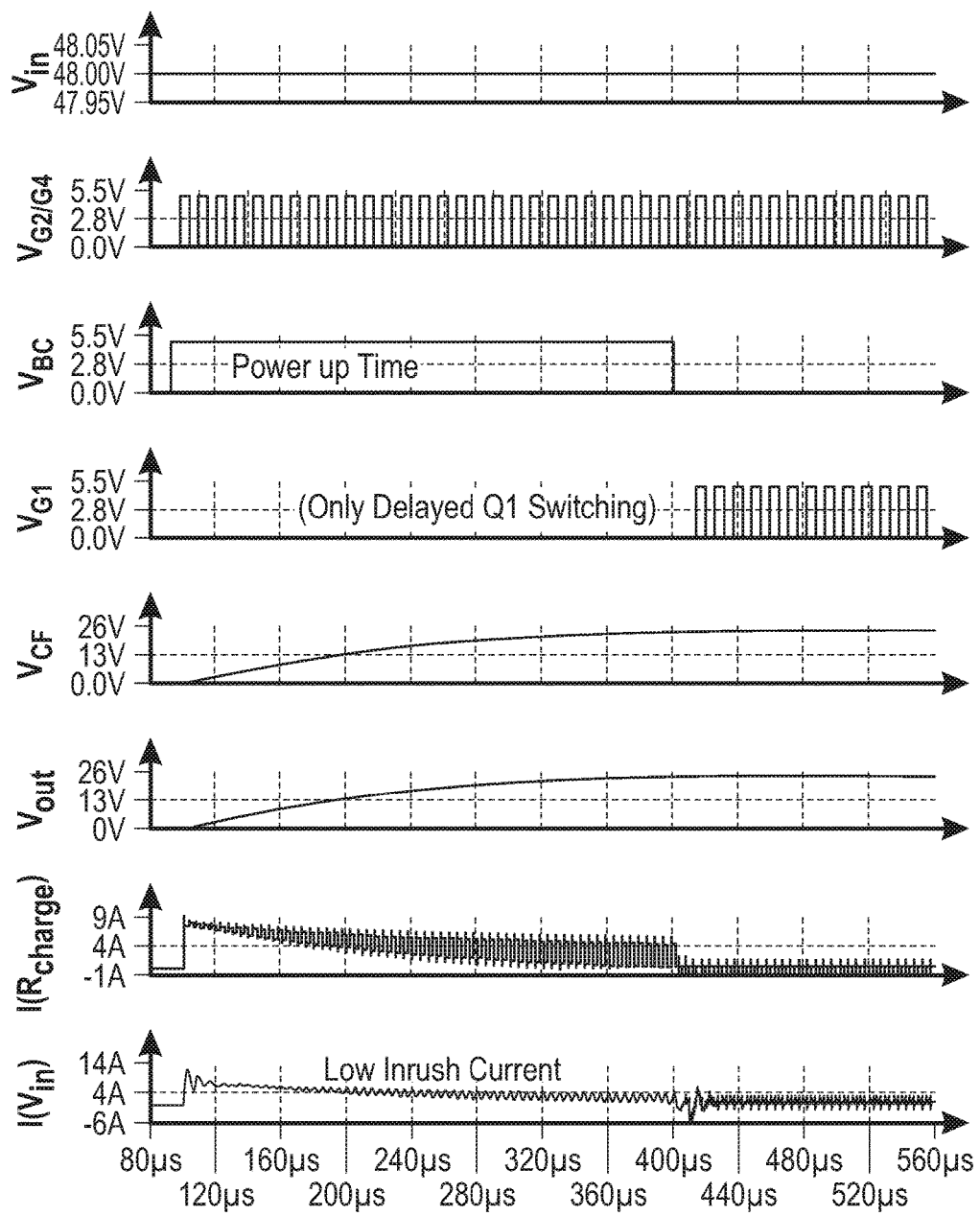
FIG. 7 illustrates second exemplary control signals and results obtained in a second simulation applying the control signals to a model of the exemplary soft-charging switched capacitor converter shown by FIG. 4.

FIG. 7 illustrates second exemplary control signals and results obtained in a second simulation applying the control signals to a model of the exemplary SCSC converter 400 shown by FIG. 4. The simulation included the sequence described with respect to FIGS. 5A and 5B. In the depicted case, BC is a long constantly on pulse during soft-charging time period.

Figure 8B:
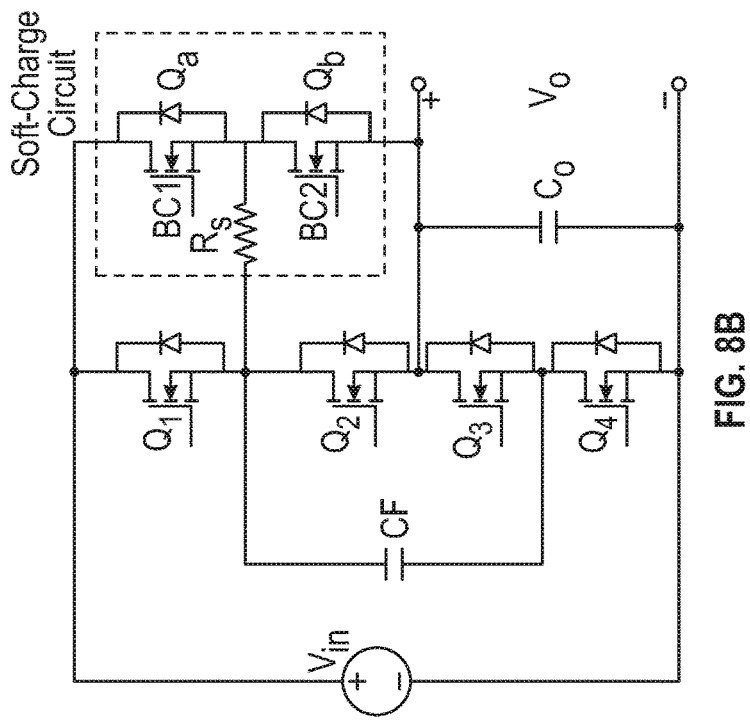
FIGS. 8A, 8B, and 8D are diagrams illustrating exemplary implementations of a soft-charging switched capacitor converter, including a multiple switching transistor bypass soft-charging circuit.
Figure 8A:
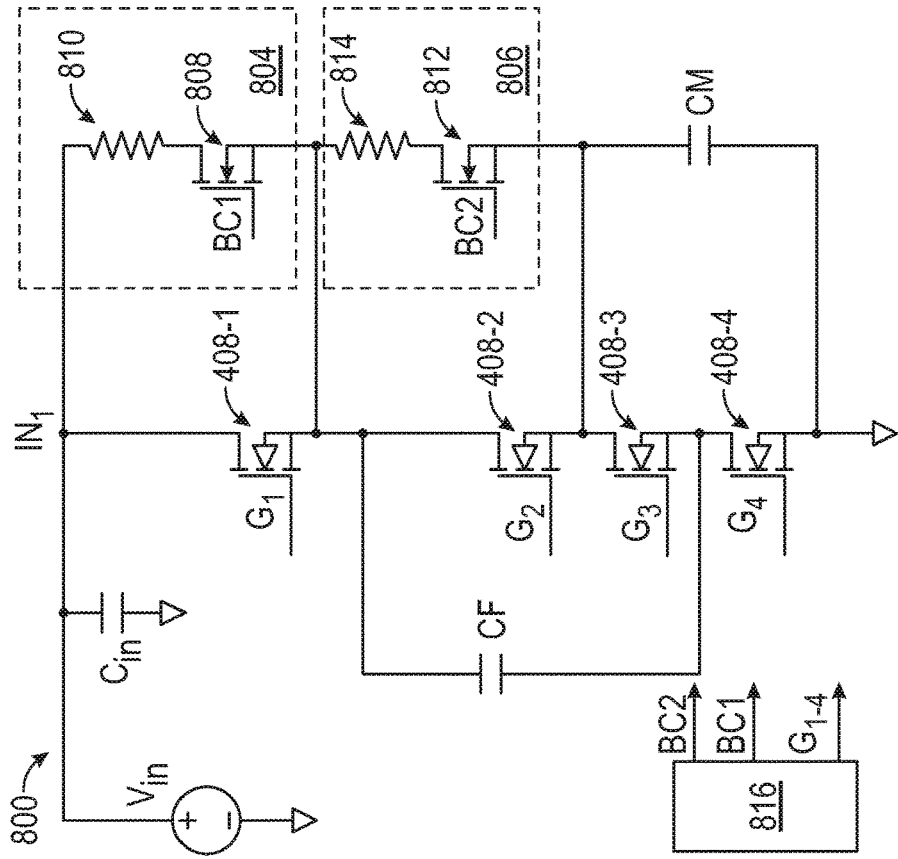

FIGS. 8A and 8B are diagrams illustrating an exemplary implementations of an SCSC converter 800, including a multiple switching transistor bypass soft-charging circuit. To focus on certain features and technical advantages that may be particular to aspects of the multiple switching transistor bypass soft-charging circuit, the SCSC converter 800 is shown as an adaptation of the FIG. 4 SCSC converter 400. It is understood that this is not intended to limit the scope of applications and implementations of the depicted multiple switching transistor bypass soft-charging circuit to the FIG. 4 SCSC converter 400. Instead, it is understood the features of the multiple switching transistor bypass soft-charging circuit can be adapted to various types and architectures of switched capacitor converters described herein.

Referring to FIG. 8A, the multiple switching transistor bypass soft-charging circuit includes a first auxiliary bypass sub-circuit 804 coupled to the IN terminal and a second auxiliary bypass sub-circuit 806 coupled between the first auxiliary bypass sub-circuit 804 and the buffer capacitor CM. In the depicted implementation, first auxiliary bypass element 804 includes a first bypass transistor 808 in series with a first impedance element (e.g., a first limiting resistor 810), and the second auxiliary bypass sub-circuit 806 includes a second bypass transistor 812 in series with a second impedance element (e.g., a second limiting resistor 814). While the impedance elements are resistors in the depicted example, the impedance elements may be or include other elements, such as an inductor.

Operation of the multiple bypass soft-charging pre-charger 800 requires power-up disabling of the second switching transistor 408-2, in addition to the above-described FIG. 4 power up disabling of the first switching transistor 408-1. A soft-charging switching control circuit 816 can provide a first bypass control BC1 to the first bypass transistor 808, a second bypass control BC2 to the second bypass transistor 812, in connection with a respective disabling of the first switching transistor control signal G1 and second switching transistor control signal G2.

The soft-charging switching control circuit 816 can be configured to switch between a multi-bypass soft-charging mode during power up or fast input voltage transients, and a steady-state operational mode. The multi-bypass soft-charging mode can include disabling the first switching transistor control signal G1, and the second switching transistor control signal G2, concurrent with generating respective BC1 and BC1 switching signals at the first bypass transistor 808 and the second bypass transistor 812. In this manner, the control circuit 816 switches the first bypass transistor 808 on an off (during the soft-charging mode) in place of the first switching transistor 408-1, and switches the second auxiliary transistor on and off (during the soft-charging mode) complementary to the switching of the first bypass transistor 808 and in place of the second switching transistor 408-2. The operational mode can include disabling BC1 and BC2 while generating G1, G2, G3, and G4 with respective PWM parameters and timings. In this regard, the switching bridge circuit 402 can switch interconnection of the flying capacitor CF and buffer capacitor CM in accordance with a default switching cycle of the switched capacitor converter.

The soft-charging switching control circuit 816 can switch to the multi-bypass soft charging mode in response to a power down of the SCSC converter 800 so that G1 and G2 are disabled during a power up of the SCSC converter 800. The soft-charging switching control circuit 816 can maintain the multi-bypass soft-charging mode during power up, and switch to the steady-state operational mode after the output capacitor CM voltage is charged up to the desired level.

In some implementations, the soft-charging switching control circuit 816 can switch to the soft-charging mode upon a power up, disabling G1 and G2, concurrent with enabling BC1, BC2, G3, and G4 switching signals. The Vin voltage causes a total device precharge current (not visible in FIG. 8) to flow from the IN terminal, through the first limiting resistor 810 and the enabled first bypass transistor 808, and then to the first node 410 and then to the flying capacitor CF and the output capacitor CM. When first switching transistor 408-1 and third switching transistor 408-3 are switched off, and second switching transistor 408-2 and fourth switching transistor 408-4 are switched ON, CM and CF are placed in parallel and current may flow from one capacitor to the other. The second current limit resistor 814 limits the current between CF and CM when the transistor 812 is on, for example if the initial voltage on CF is much higher than the initial voltage on CM at power up.

The soft-charging switching control circuit 816 can maintain SCSC converter 800 in the multi-bypass soft-charging mode until lapse of a given time since switching to that mode, or until threshold detection (e.g., of a given charge voltage), or notification of a precharge complete event (e.g., when the output voltage on capacitor CM reaches its desired level). The soft start switching control circuit 816 can then switch to the steady state operational mode where it disables BC1 and BC2, and generates G1, G2, G3, and G4 with respective PWM parameters and timings such that the switching bridge circuit 402 switches interconnection of the flying capacitor CF and output capacitor CM in accordance with the switching cycle.

Figure 8D:
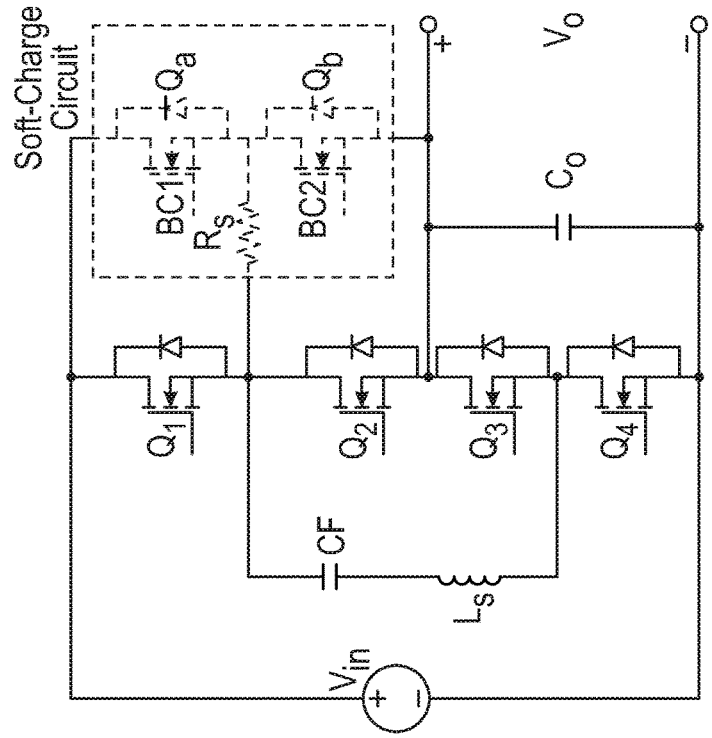
Figure 8C:
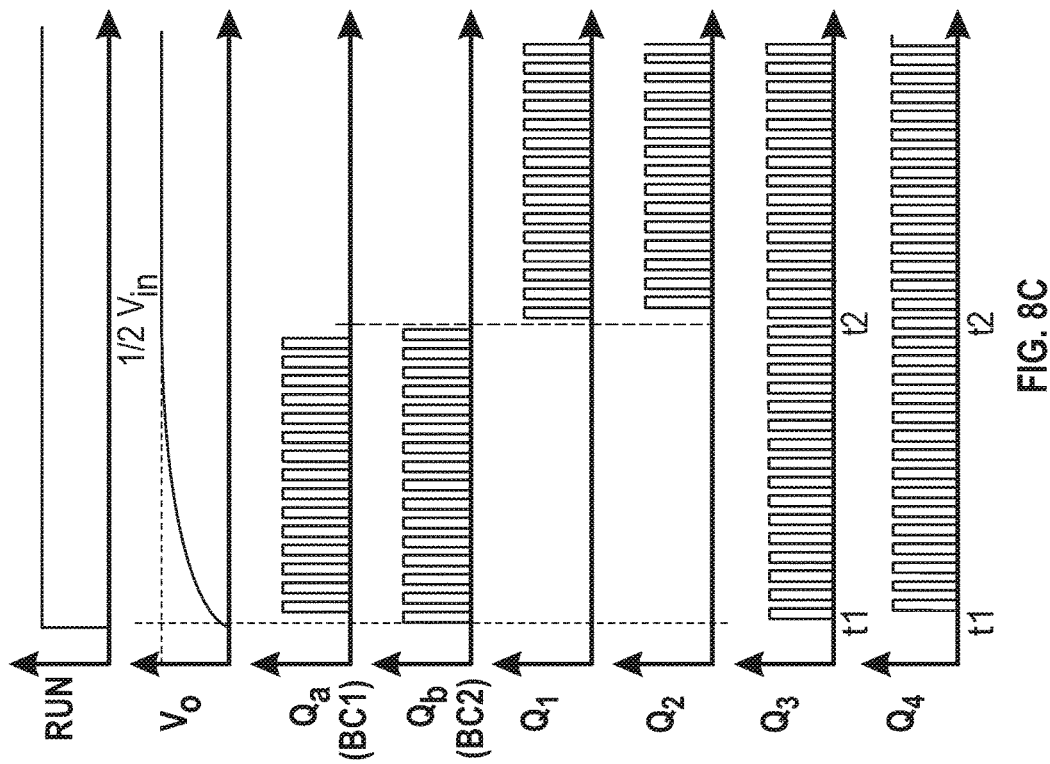
FIG. 8C illustrates exemplary control signals for the exemplary implementation shown in FIG. 8B.

In FIG. 8B, the two auxiliary bypass sub-circuits share a single impedance element (e.g., current limiting resistor Rs), instead of the two impedance elements used in the implementation depicted in FIG. 8A. In the depicted example, the impedance element is connected between a first node linking the first and second bypass transistors (Qa and Qb) and a second node linking the first and second switching transistors. In this regard, the impedance element is shared by both bypass circuits such that it will limit current to or between CF and CM in both the soft-charging and operational modes. While the impedance element is a resistor in the depicted example, the impedance element may be or include other elements, such as an inductor. FIG. 8C shows conceptual control signals for the implementation in FIG. 8B. FIG. 8D shows an implementation of the SCSC converter of FIG. 8A with a resonant inductor Ls in series with the flying capacitor Cfly.

FIG. 9A is a diagram illustrating a first exemplary implementation of an SCSC step up converter, including an example auxiliary bypass circuit 902. In the depicted implementation, the output voltage can be twice of the input voltage in steady state mode. The auxiliary bypass circuit 902 is in parallel with the main transistor 408-4. In soft-charging mode during power up, BC is in a switching-enabled state, and G4 is in disabled state, and an impedance element 906 limits charging current. While the impedance element is a resistor in the depicted example, the impedance element can be or include other elements, such as an inductor.

In the depicted configuration, a control circuit 908, implementing a switching cycle, may simultaneously switch first switching transistor 408-1 and third switching transistor 408-3 to the "on" state, while at the same time switching second transistor 408-2 and fourth switching transistor 408-4 to the complimentary "off" state, and then vice versa. In the depicted example, this switching cycle places CF and CM in series between Vout and a ground when the first and third switching transistors are switched on and the second and fourth switching transistors are switched off, and places CF and CM in parallel between Vin and a ground when the second and fourth switching transistors are switched ON and the first and third switching transistors are switched off. In this regard, the regulated power provided to Vout is twice the voltage potential of Vin.

The control circuit 908 can switch the converter circuit between a soft-charging mode in which the auxiliary bypass circuit 902 is activated and a main switching transistor 408-4 is deactivated, and an operational mode in which the auxiliary bypass circuit 902 is deactivated and the main switching transistor 408-4 is activated. During the soft-charging mode, the auxiliary bypass circuit 902 periodically switches transistor 904 on and off in place of the fourth switching transistor 408-4 according to the switching cycle. The control circuit 908 can maintain the converter circuit in the soft-charging mode in response to a power-up of the converter circuit or in response to a fast input voltage transient at the first terminal, and to switch the converter circuit to the operational mode when the output capacitor reaches a threshold charge.

The control circuit 908, when the converter circuit is in the soft-charging mode, places the capacitor CF in series with the impedance element 906, between ground and Vin, and switches the transistors according to a first PWM cycle to charge the capacitor CF. When the converter circuit is in the operational mode, the control circuit 908 can switch the transistors according to a second PWM cycle to provide twice of a voltage of the voltage source at the Vout terminal.

FIG. 9B is a diagram of a second exemplary SCSC step up converter, including a multiple switching transistor bypass soft-charging circuit 910. Similar to the example depicted in FIG. 9A, during the soft-charging mode, a first bypass transistor 904 is switched on and off in place of the fourth switching transistor 408-4. Additionally, bypass soft-charging circuit 910 includes a second bypass transistor 910 connected between node 412 and a node linking the first bypass transistor 904 and the impedance element 906. In accordance with the switching cycle, the second bypass transistor 910 is switched on and on in place of the third switching transistor 408-3. Without limitation, a second impedance element (not shown) may be added, as shown in FIG. 8A.

Figure 10:
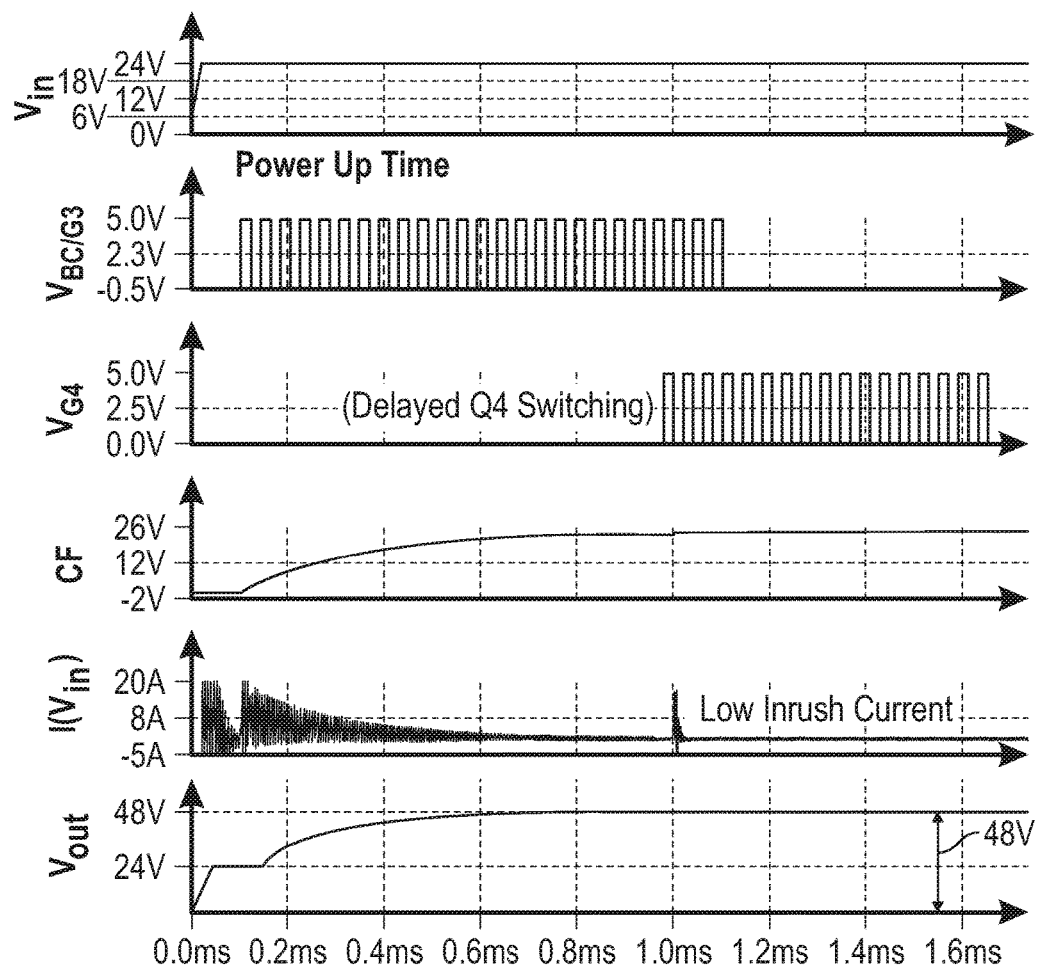
FIG. 10 illustrates exemplary control signals and results obtained in simulations applying the control signals to a model of soft-charging switched capacitor converter shown by FIG. 9.

FIG. 10 illustrates exemplary control signals and results obtained in simulations applying the control signals to a model of the exemplary SCSC converter of FIG. 9. FIG. 10 demonstrates a low in-rush current introduced to the circuit during a pre-charge of output capacitor CF utilizing multiple switching transistor bypass soft-charging circuit 910.

Figure 11A:
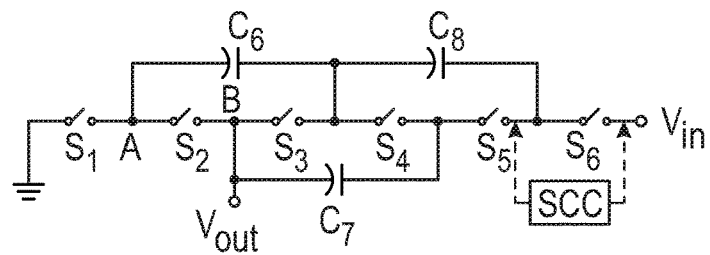
FIGS. 11A to 11D are diagrams of exemplary ladder type, Dickson type, Fibonacci type, and series-parallel type soft-charging switched capacitor converters.
Figure 11B:
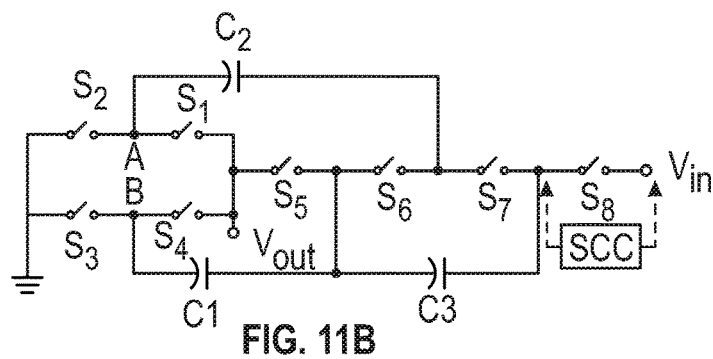
Figure 11C:
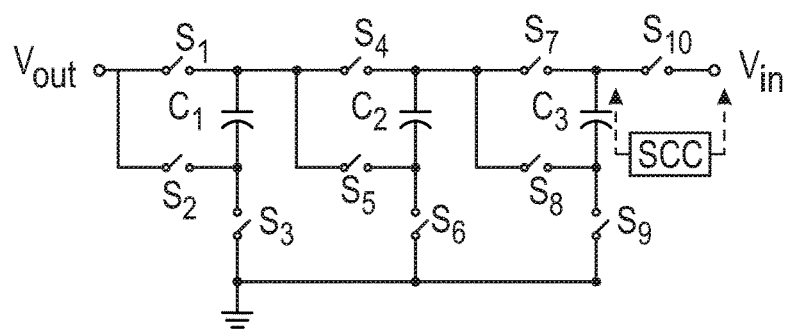
Figure 11D:
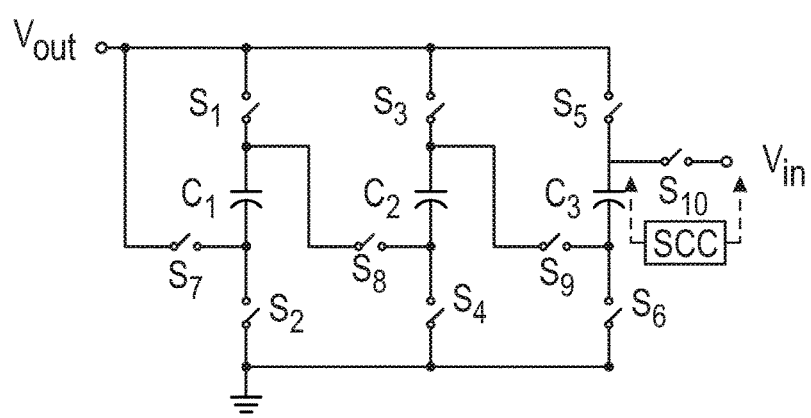
Figure 11E:
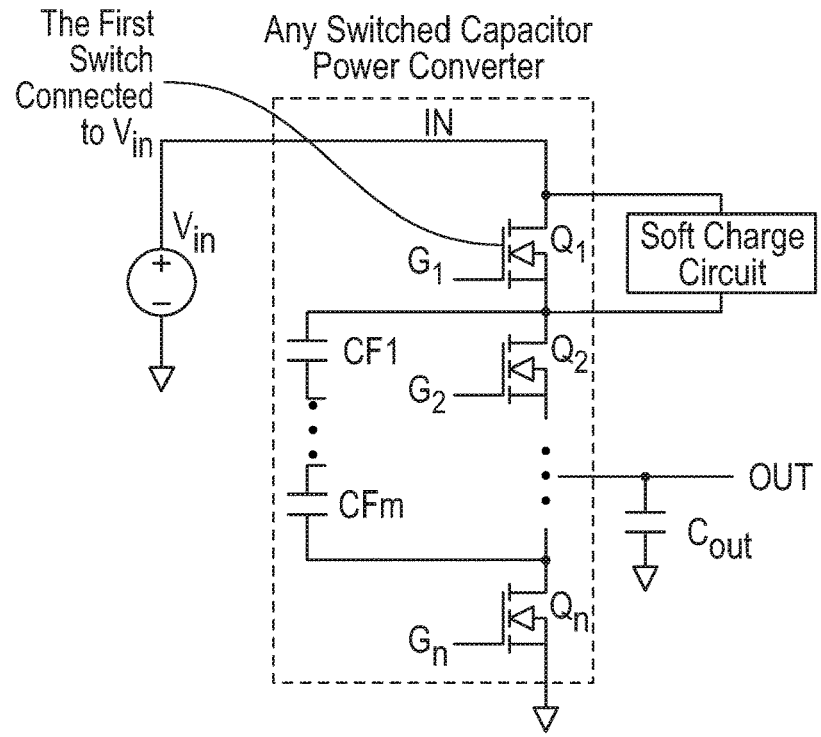
FIG. 11E is a diagram of an exemplary auxiliary bypass soft-charging circuit utilized in an exemplary higher n-order converter circuit.
Figure 11F:
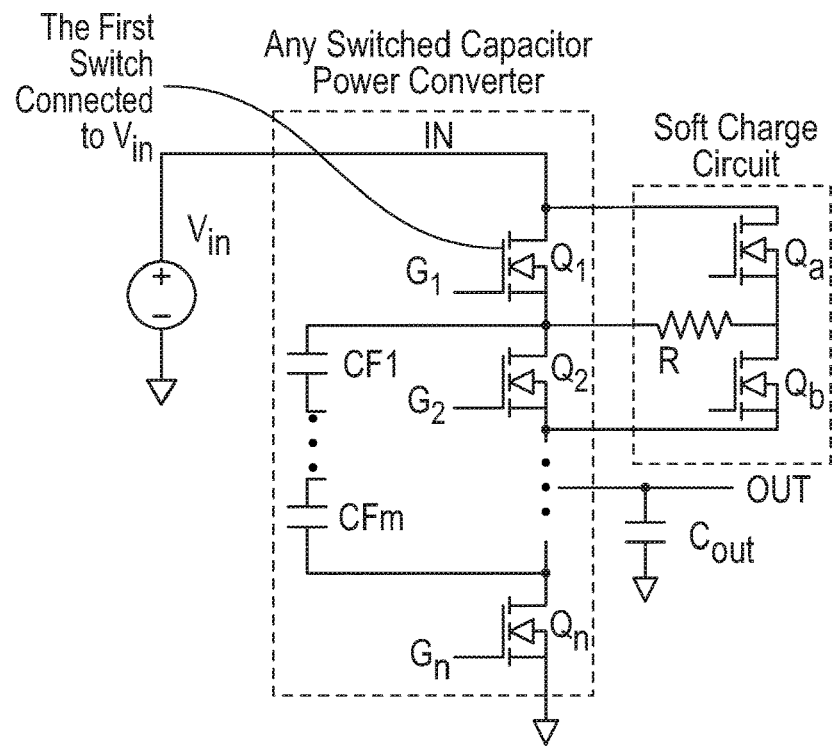
FIG. 11F is a diagram of a multiple switching transistor bypass soft-charging circuit utilized in an exemplary higher n-order converter circuit.

FIGS. 1A-11D are diagrams of ladder type, Dickson type, Fibonacci type, and series-parallel type of SCSC converters. Element "SCC" in the diagrams is representative of an auxiliary bypass soft-charging circuit in parallel with a corresponding transistor at the VIN terminal. FIG. 11E is a diagram representative of an auxiliary bypass soft-charging circuit being utilized in a higher n-order SCSC converter circuit. During a soft-charging mode, the depicted capacitors are precharged when an auxiliary transistor (not shown) of the auxiliary bypass soft-charging circuit is switched in place of Q1 according to a switching cycle of the converter. FIG. 11F illustrates an exemplary n-order SCSC converter circuit that includes a multiple switching transistor bypass soft-charging circuit. During the soft-charging mode, the depicted capacitors are precharged when Qa and Qb of the auxiliary bypass soft-charging circuit are switched in place of Q1 and Q2, respectively, according to a switching cycle of the converter. While the depicted multiple switching transistor bypass soft-charging circuit includes two bypass transistors and one current limit resistor, the circuit can include two resistors and/or one or more inductors.

Figure 12A:
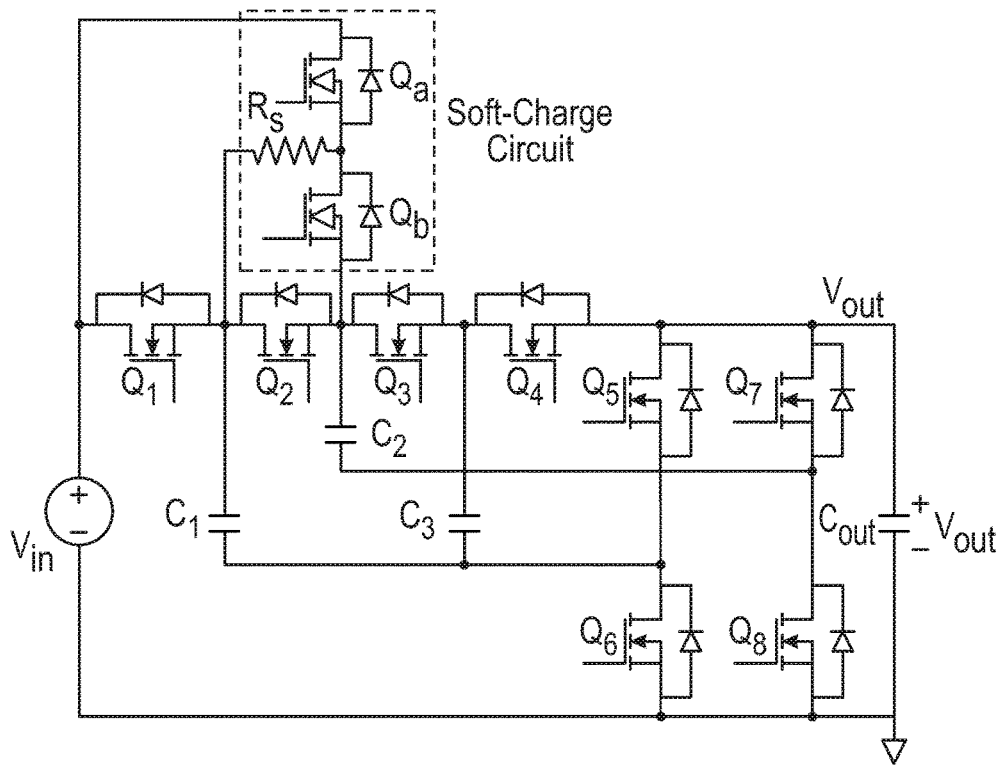
FIGS. 12A and 12B illustrate exemplary converter circuits utilizing a multiple switching transistor bypass soft-charging circuit.
Figure 12B:
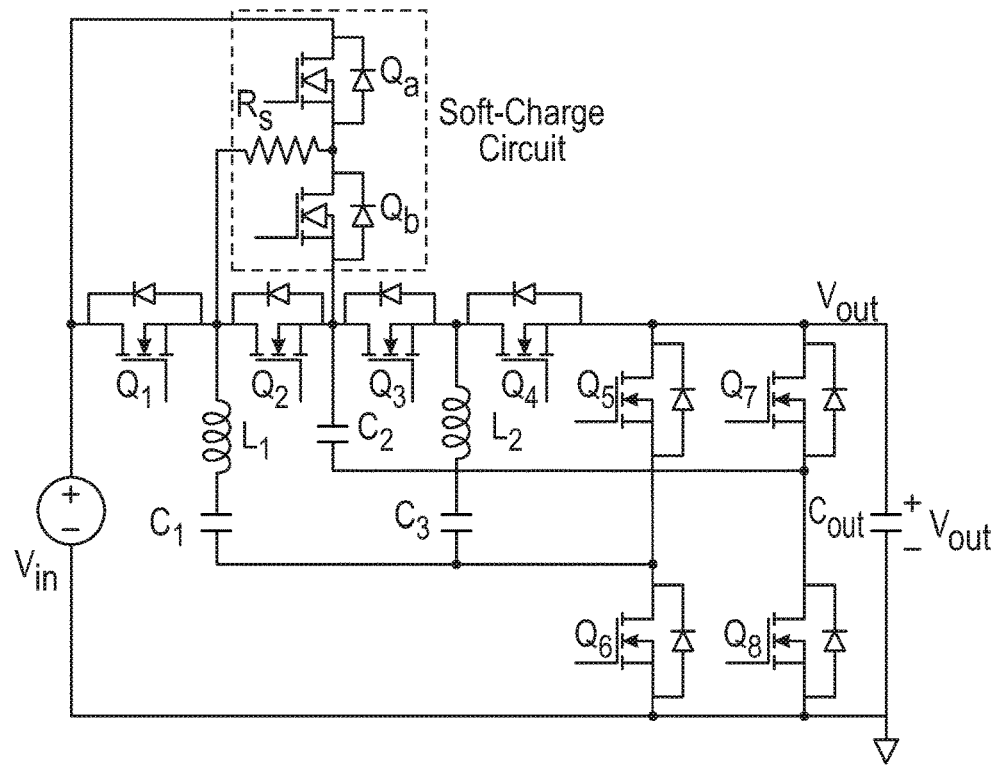

FIG. 12A illustrates an exemplary switched capacitor Dickson type SCSC converter circuit, utilizing the previously-described multiple switching transistor bypass soft-charging circuit. FIG. 12B illustrates an exemplary resonant-type Dickson SCSC converter circuit, utilizing the previously-described multiple switching transistor bypass soft-charging circuit. In these examples, eight main switching transistors Q1 to Q8 are utilized, with the switching control circuit switching transistors Q1 to Q8 according to a switching cycle. Auxiliary transistors Qa and Qb are switched in place of Q1 and Q2, respectively, during the soft-charging mode.

FIGS. 13A-13E are diagrams of exemplary implementations ladder type, Dickson type, Fibonacci type, series-parallel and voltage divider type switched capacitor converters with a modified L/C output. In each of the depicted configurations, an auxiliary soft-charge bypass circuit is arranged in parallel to a switching transistor connected to Vin. As described previously, each auxiliary soft-charge bypass circuit includes one or more auxiliary transistors and at least one impedance element (e.g., a resistor and/or inductor), and provides an auxiliary circuit path through the impedance element to charge the depicted capacitors in the respective circuit when the auxiliary soft-charge bypass circuit is activated and the switching transistor connected to Vin is deactivated. In each of the depicted configurations, an output capacitor is connected to a ground terminal, and Vout is at a node connected between the output capacitor and an inductor connected to another node in the switching network.

FIG. 14A is a diagram representative of an auxiliary bypass soft-charging circuit being utilized in a higher n-order SCSC hybrid converter circuit with an inductor output. During a soft-charging mode, the depicted capacitors are precharged when an auxiliary transistor (not shown) of the auxiliary bypass soft-charging circuit is switched in place of Q1 according to a switching cycle of the converter. FIG. 14B is an exemplary implementation of a higher n-order SCSC hybrid converter circuit, including a multiple switching transistor bypass soft-charging circuit. During the soft-charging mode, the depicted capacitors are precharged when Qa and Qb of the auxiliary bypass soft-charging circuit are switched in place of Q1 and Q2, respectively, according to a switching cycle of the converter. Two bypass sub-circuits are shown sharing a single impedance element. However, other implementations may include each sub-circuit having one or more impedance elements, such as shown in FIG. 8A.

Figure 15:
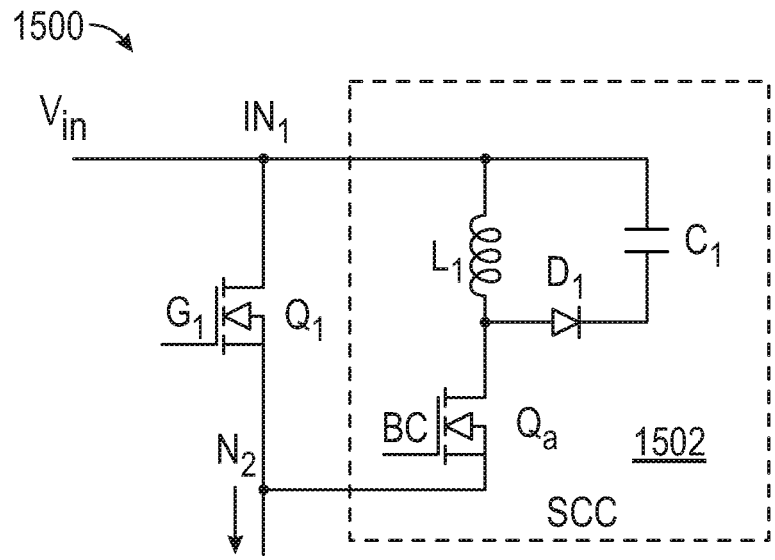
FIG. 15 is a diagram of a first exemplary implementation of a soft-charging Buck converter, including an auxiliary bypass soft-charging circuit (SCC).

FIG. 15 is a diagram of a first exemplary implementation of soft-charging Buck converter 1500, including an auxiliary bypass soft-charging circuit. In the depicted example, a first transistor Q1 establishing a first circuit path between a first terminal IN1 and a second terminal N2, to provide regulated power to a load (e.g., downward from N2). An output capacitor (not shown) may be connected at N2 and/or at the load. An auxiliary soft-charge bypass circuit 1502 includes a current limiting inductor L1 and a second transistor Qa. In the depicted example, a diode D and capacitor C1 are in parallel with inductor L1. When the auxiliary soft-charge bypass circuit 1502 is activated and the first transistor is deactivated, the circuit 1502 provides a second circuit path, in parallel to the first circuit path between the first terminal and the second terminal, to charge the output capacitor. As described previously, a control circuit switches the converter circuit between a soft-charging mode in which the auxiliary soft-charge bypass circuit 1502 is activated (e.g., by enabling switching signal BC) and the first transistor Q1 is deactivated, and an operational mode in which the auxiliary soft-charge bypass circuit 1502 is deactivated and the first transistor Q1 is activated (e.g., switched according to a default switching cycle). The control circuit maintains the converter circuit in the soft-charging mode in response to a power-up of the converter circuit or to a fast input voltage transient at the first terminal IN1, and switching the converter circuit to the operational mode when the output capacitor reaches a threshold charge.

Figure 16:
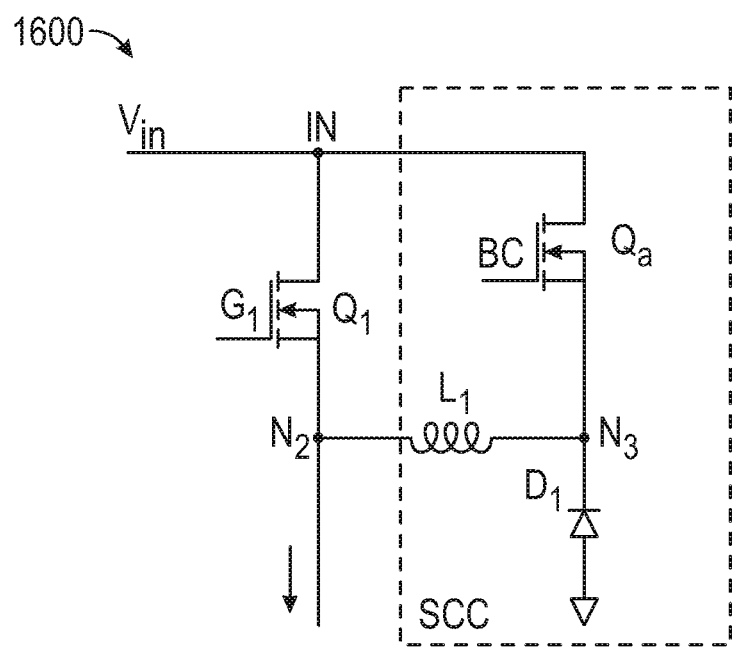
FIG. 16 is a diagram of a second exemplary implementation of a soft-charging Buck converter, including an auxiliary bypass soft-charging circuit.

FIG. 16 is a diagram of a second exemplary implementation of a soft-charging Buck converter 1600, including an auxiliary bypass soft-charging circuit. In the depicted example, C1 is removed and diode D1 is placed between a node N3 and ground.

Figure 17:
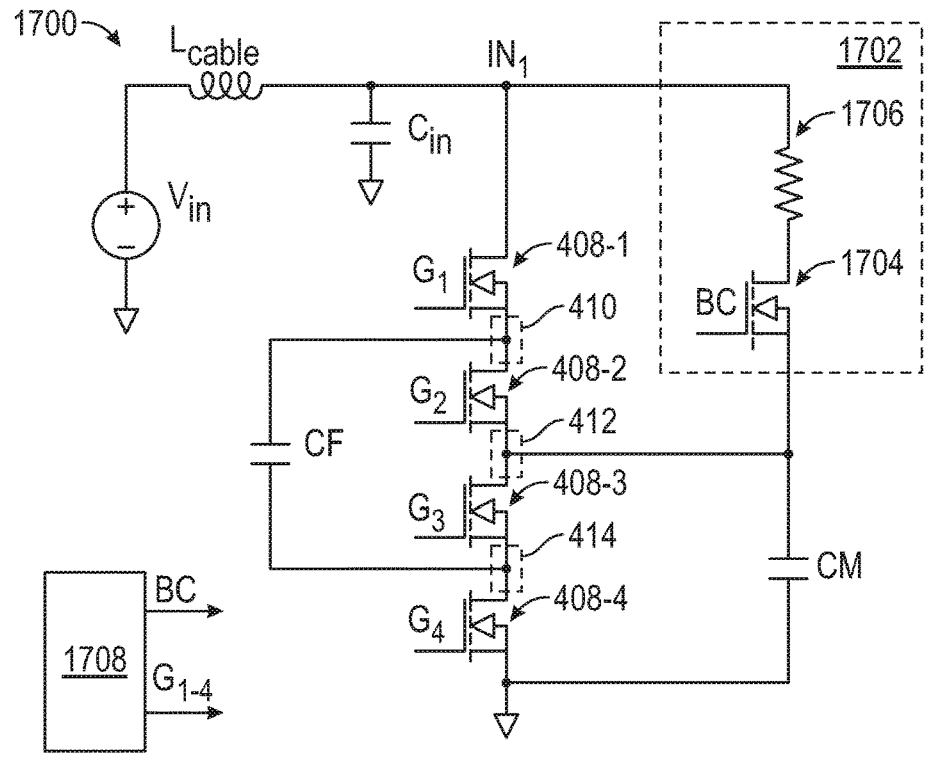
FIG. 17 is a diagram of an exemplary implementation of a soft starting switched capacitor step-down converter, including an auxiliary bypass soft-charging circuit.

FIG. 17 is a diagram of an exemplary implementation of a SCSC step-down converter 1700, including an auxiliary soft-charge bypass circuit 1702. The SCSC converter 1700 is shown as an adaptation of the FIG. 4 SCSC converter 400. The auxiliary bypass circuit 1702 can include a bypass transistor 1704 in series with a limiting resistor 1706, and connects between the IN1 terminal and the second node 412. Accordingly, the auxiliary multiple bypass device 1702 forms a direct path for precharging current flow from the IN1 terminal to the output capacitor CM in the power up soft-charging mode. The auxiliary bypass device 1702, as described, can also provide precharging current to the flying capacitor CF concurrent with the above-described precharging current to the buffer capacitor CM. CF and CM can be precharged concurrently by maintaining the fourth switching transistor 408-4 in a switching enabled state, concurrent with maintaining the first switching transistor 408-1 and third switching transistor 408-3 in a switching disabled state, throughout the soft start precharging time period.

To provide the previously-described states of the switching transistors 408, the soft-charging switching control circuit 1708 can switch between a soft-charging mode during power up that generates the first switching transistor control signal G1 and third switching transistor control signal G3 at transistor disabling states, concurrently with second switching transistor control signal G2 and fourth switching transistor control signal G4 at transistor switching states (e.g., using PWM switch timing), further concurrently with bypass device control signal BC at a enabled state. The steady state operational mode can include disabling BC and generating G1, G2, G3, and G4 with respective PWM parameters and timings such that the switching bridge circuit 402 switches interconnection of the flying capacitor CF and output capacitor CM in accordance with a default switching cycle.

Accordingly, upon receipt of voltage Vin at the IN1 terminal the first and third switching transistors 408-1 and 408-3 are disabled (e.g., turned off), while the auxiliary multiple bypass device 1702 as well as the second and fourth switching transistors 408-2 and 408-4 are enabled (e.g., switched according to a switching cycle). The Vin voltage therefore causes a total device precharge current (not visible in FIG. 17) to flow from the IN terminal, through the limiting resistor 1706 and the enabled bypass transistor 1708 to charge up the flying capacitor CF and output capacitor CM. The enabled fourth switching transistor 408-4 connects the bottom terminal of the flying capacitor CF to the local ground.

The soft-charging switching control circuit 1708 can maintain in the above-described soft-charging mode (e.g., switching the enabled transistors according to a switching cycle) until lapse of a given time since switching to that mode, or until detection, e.g., detecting a given charge voltage, or notification of a precharge complete event after the output capacitor CM voltage reaches its desired level. The soft-charging switching control circuit 1708 can then switch to the steady-state operational mode, where it disables signal BC, and generates signals G1, G2, G3, and G4 with respective PWM parameters and timings such that the switching bridge circuit 402 switches interconnection of the flying capacitor CF and output capacitor CM in accordance with a default switching cycle.

Figure 18:
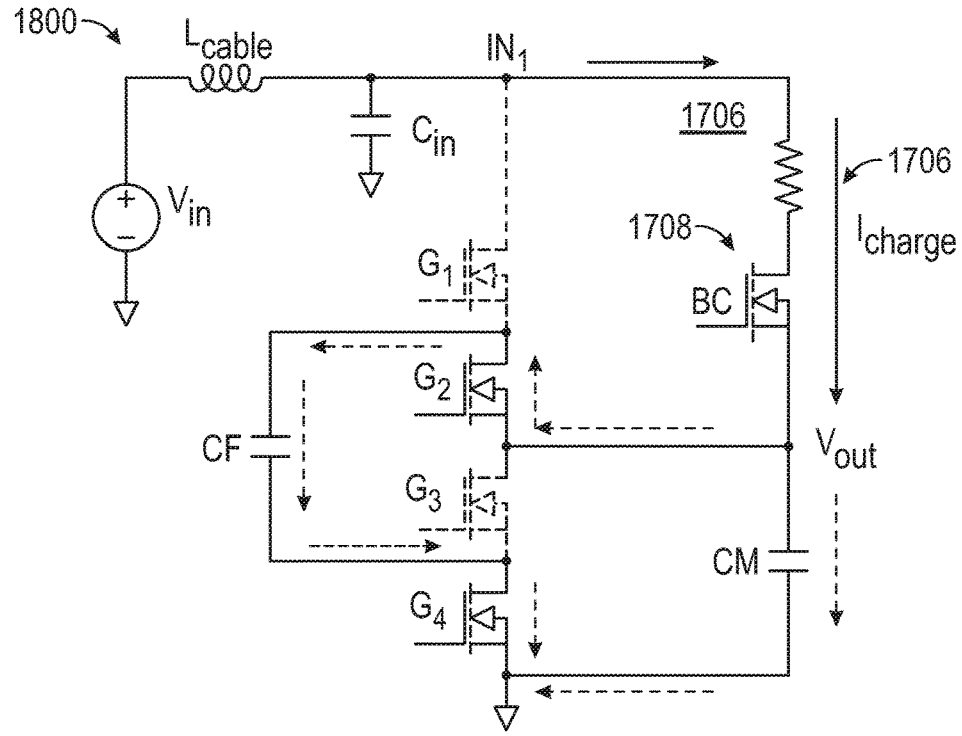
FIG. 18 illustrates respective circuit paths of exemplary operating modes associated with the circuit of FIG. 17.

FIG. 18 illustrates exemplary component states and current flows associated with power down and soft-start power up of the FIG. 17 SCSC step-down converter 1700. Referring to FIG. 18, the first and third switching transistors 408-1 and 408-3 are shown in the above-described disable transistor states of G1 and G3 during the power up soft-charging mode. The dotted line graphics for the first switching transistor 408-1 and third switching transistor 408-3 represent switching of each being disabled. The solid line graphics for the bypass transistor 1708 represent its enabled state. Assuming Vin at the IN1 terminal, the above-described device total precharge current, labeled in FIG. 18 as "Icharge," flows from the IN1 terminal, through the limiting resistor 1706, through the enabled bypass transistor 1708 where it branches into separated current flow, to the output capacitor CM and the flying capacitor CF, respectively.

Figure 19:
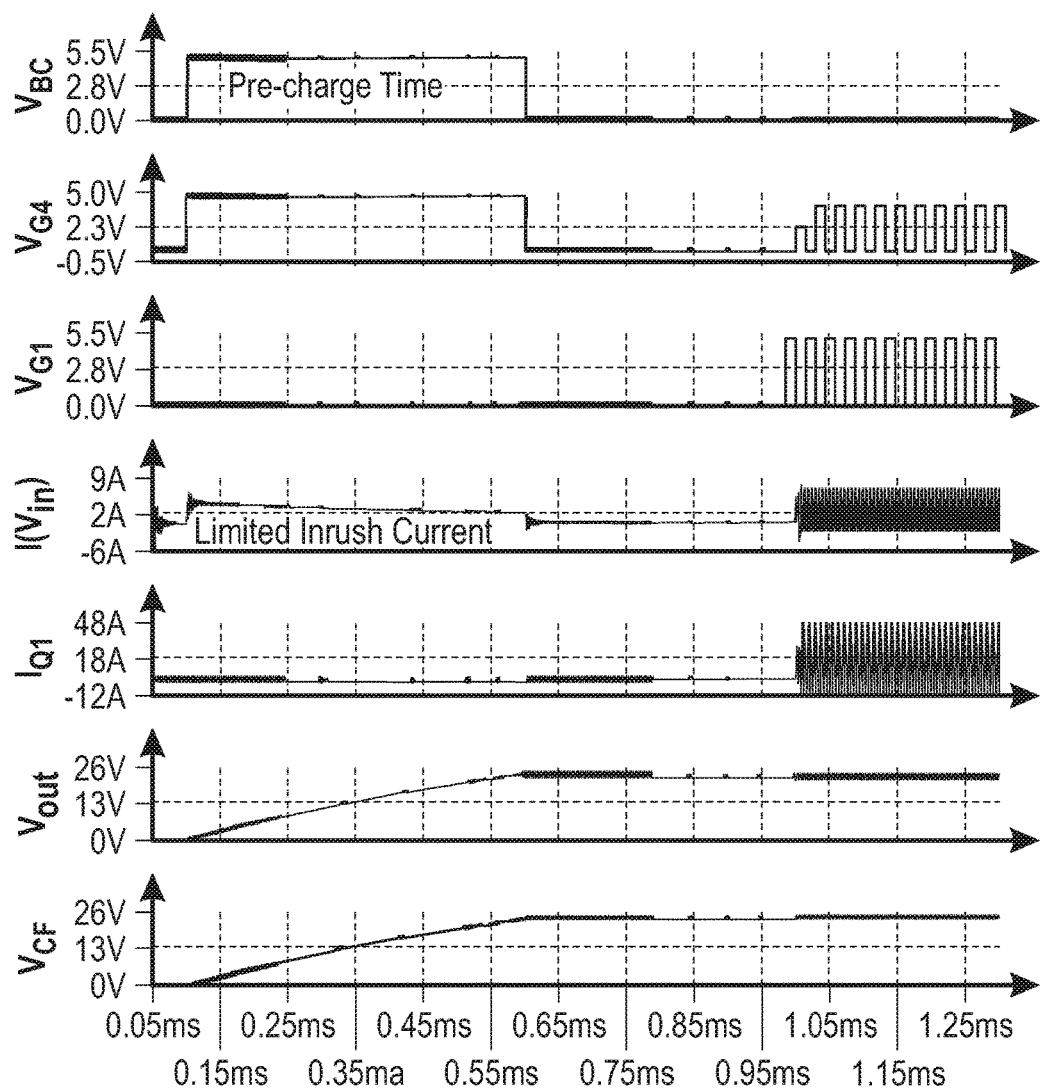
FIG. 19 illustrates exemplary control signals and results obtained in simulations applying the control signals to a model of the exemplary soft starting switched capacitor step-down converter shown by FIG. 17, in a simulation of a soft start power up operating mode.

FIG. 19 illustrates exemplary control signals and results obtained in simulations applying the control signals to a model of the exemplary SCSC step-down converter 1700 shown by FIG. 17, in a simulation of a soft-charging power up as illustrated in FIG. 18.

Figure 20:
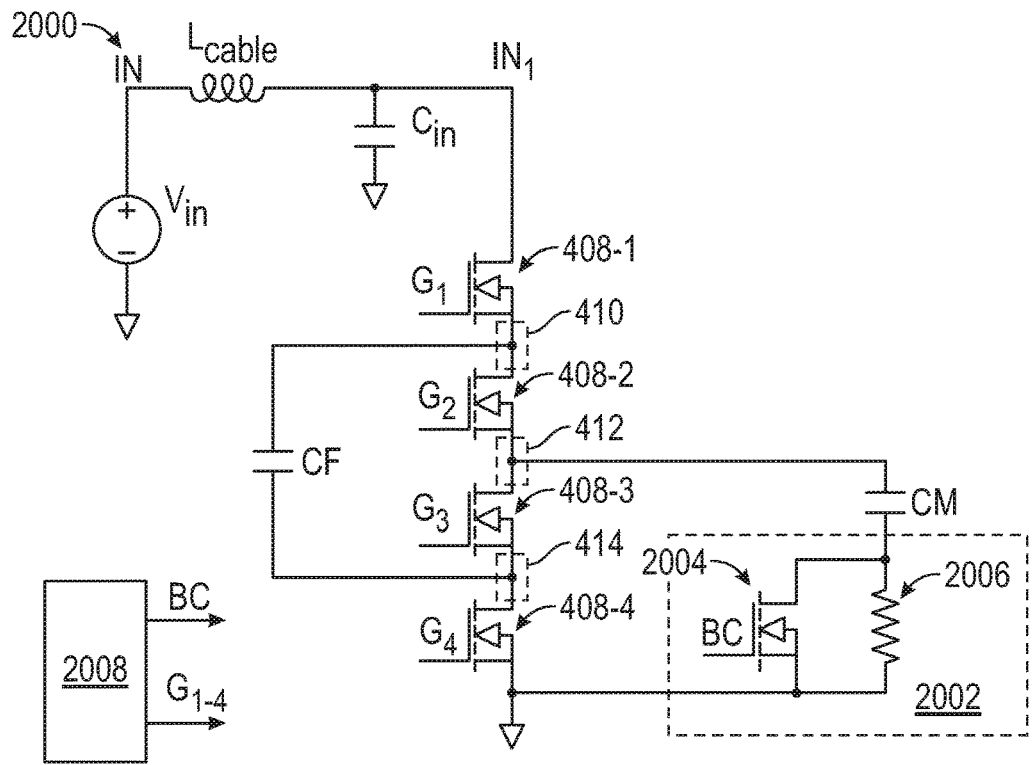
FIG. 20 is a diagram of an implementation of a soft-charging switched capacitor converter, including an exemplary auxiliary bypass soft-charging circuit connected at a ground terminal.

FIG. 20 is a diagram illustrating an exemplary implementation of a SCSC step-down converter 2000, including an exemplary modified bypass soft-charging circuit connected at a ground terminal. In the depicted example, the bypass soft-charging circuit is implemented as a shunted in-rush current limiter 2002 arranged to provide a switchable impedance coupling of the lower terminal of the output capacitor CM to ground. The shunted in-rush current limiter 2002 includes a switchable shunt transistor 2004 that is arranged in parallel with a current limiting resistor 2006. A switching control circuit 2008 can be configured to provide a bypass control signal BC to the switchable shunt transistor 2004. The configuration can provide BC as a transistor enable signal during normal operation of the SCSC step-down converter 2000. The switchable shunt transistor 2004 can have a low drain to source ON resistance (Rds) so it does not consume substantial power in steady state operational mode. The switching control circuit 2008 can be configured such that upon detection or notification of a power up it switches BC to a state that disables the switchable shunt transistor 2004. The path to ground for the lower terminal of the buffer capacitor CM then becomes the current liming resistor 2006. The resistance value of the current limiting resistor 2006 limits the magnitude of the in-rush current through the first switching transistor 408-1 occurring during power up. One advantage of the FIG. 20 SCSC step-down converter 2000 is that, in some implementations, the G1-4 switching transistor control signals can remain uninterrupted and switch according to the default switching cycle while the bypass soft-charging circuit is activated (e.g., when shunt transistor 2004 is disabled).

Figure 21:
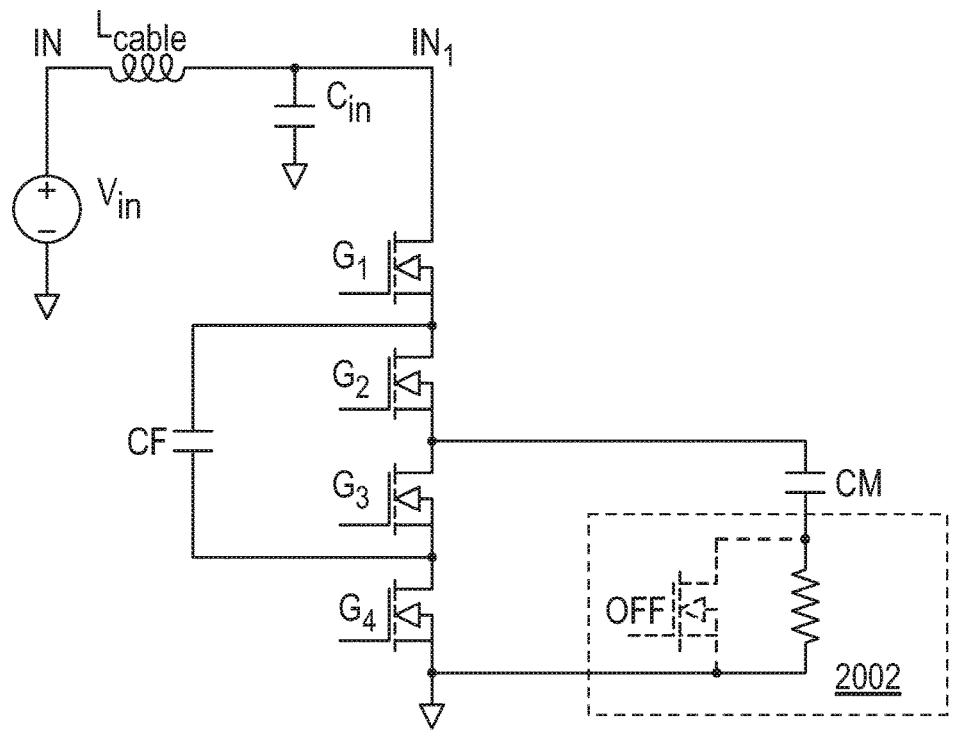
FIG. 21 illustrates an exemplary component state associated with SCSC step-down converter circuit of FIG. 20.

FIG. 21 illustrates an exemplary component state associated with SCSC step-down converter 2000. FIG. 21 depicts a soft-charging power up state in which the switching control circuit 2008 disables the shunt transistor 2004. The dotted line graphics for the switchable shunt transistor 2004 represent its disabled state. The path to ground for the lower terminal of the buffer capacitor CM then becomes the current liming resistor 2006. The normal steady state operational mode is initiated after power up, in which the switching control circuit 2008 switches BC to an enabled mode. During the steady state operational mode, the switchable shunt transistor 2004 is switched on to bypass the current liming resistor 2006.

Figure 22:
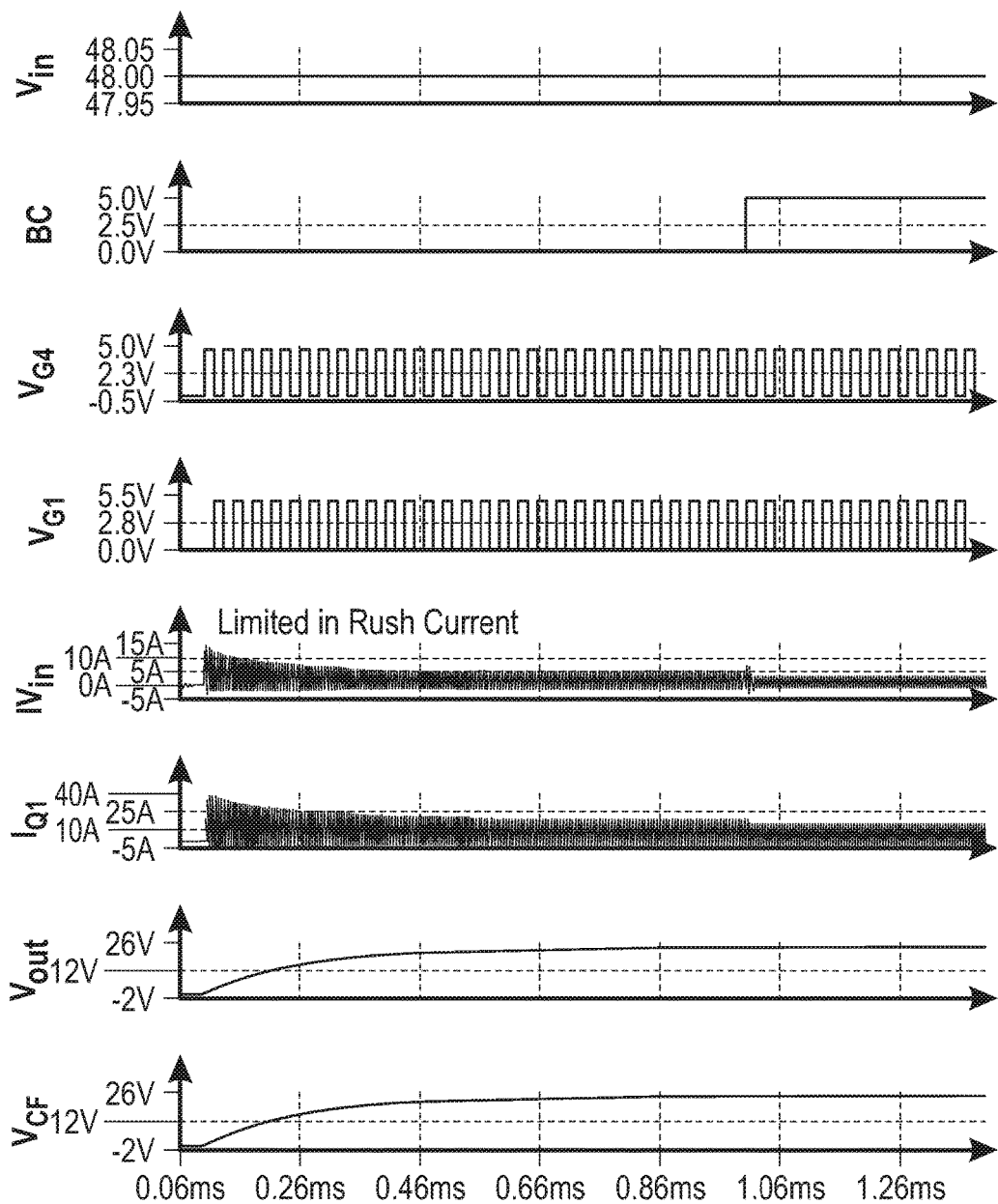
FIG. 22 illustrates exemplary control signals and results obtained in a simulation applying the control signals to a model of the exemplary soft starting switched capacitor converter of FIG. 20, including during a soft-start power up operating mode.

FIG. 22 illustrates exemplary control signals and results obtained in simulations applying the control signals to a model of the soft starting switched capacitor converter shown by FIG. 21.

Figure 23:
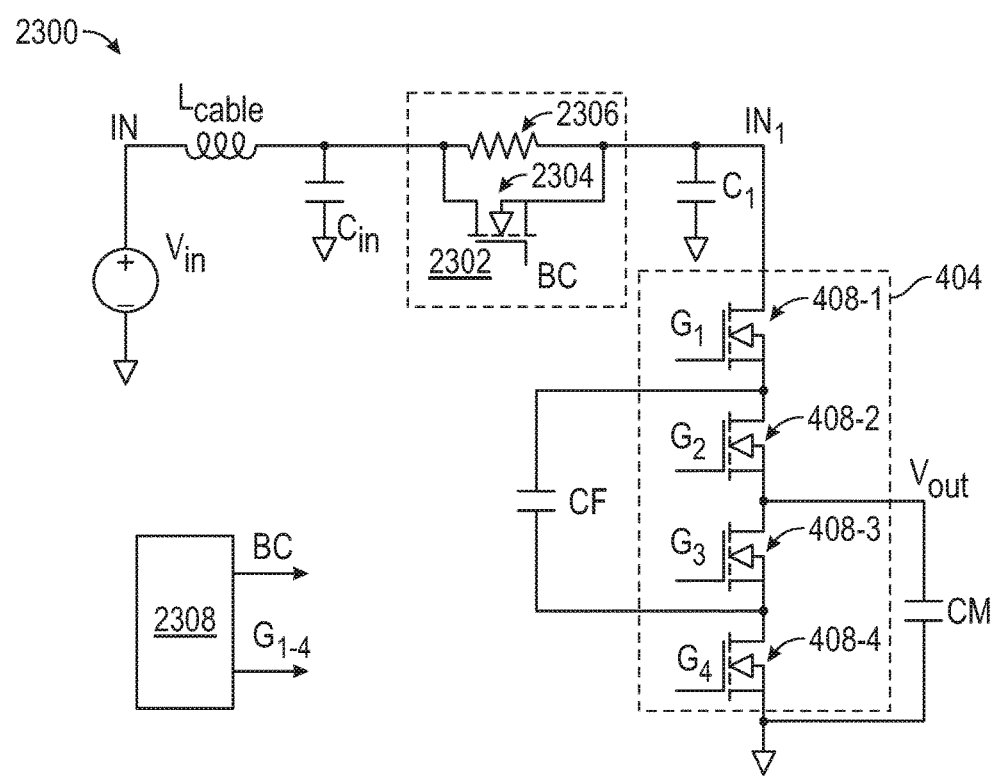
FIG. 23 is a diagram of an exemplary implementation of a soft-charging switched capacitor converter, including an exemplary auxiliary bypass soft-charging circuit connected at a power source terminal.

FIG. 23 is a diagram illustrating an exemplary implementation of a SCSC step down converter 2300, including an exemplary modified bypass soft-charging circuit connected at a power source terminal. A soft starting switched capacitor DC-DC converter 2300 can include a switchable soft-charging current limiter 2302, coupled between the Vin supply and the first switching transistor 408-1 of the switching circuit 404 (e.g., as described above in reference to FIG. 4). In the depicted example, soft-charging current limiter 2302 is in series with first switching transistor 408-1. The switchable soft-charging current limiter 2302 can include a current limiting resistor 2306 in parallel with a switchable bypass transistor 2304. A switching control circuit 2308 can provide switching transistor control signals G (including G1, G2, G3 and G4) to the switching transistors of the switching circuit 404, in accordance with a default switching cycle.

The switching control circuit 2308 can provide a bypass signal BC to the gate of the switchable bypass transistor 2304. In an aspect, the switching control circuit 2308 can disable the switchable bypass transistor 2304 during soft-charging mode at power up and, after start-up, enable the switchable bypass transistor 2304 to bypass the current limiting resistor 2306. Since the switchable bypass transistor 2304 is disabled during power up or fast Vin transient, the current limiting resistor 2306 limits current flow from Vin through the first switching transistor 408-1. Therefore, the current limiting resistor 2306 prevents excessive in-rush current through the first switching transistor 408-1 due to initial connection to a fully discharged flying capacitor CF and output capacitor CM. The switchable bypass transistor 2304 can be implemented with a low drain-to-source resistance, so that when the converter is in steady state, the conduction power loss on transistor 2304 can be low.

Figure 24:
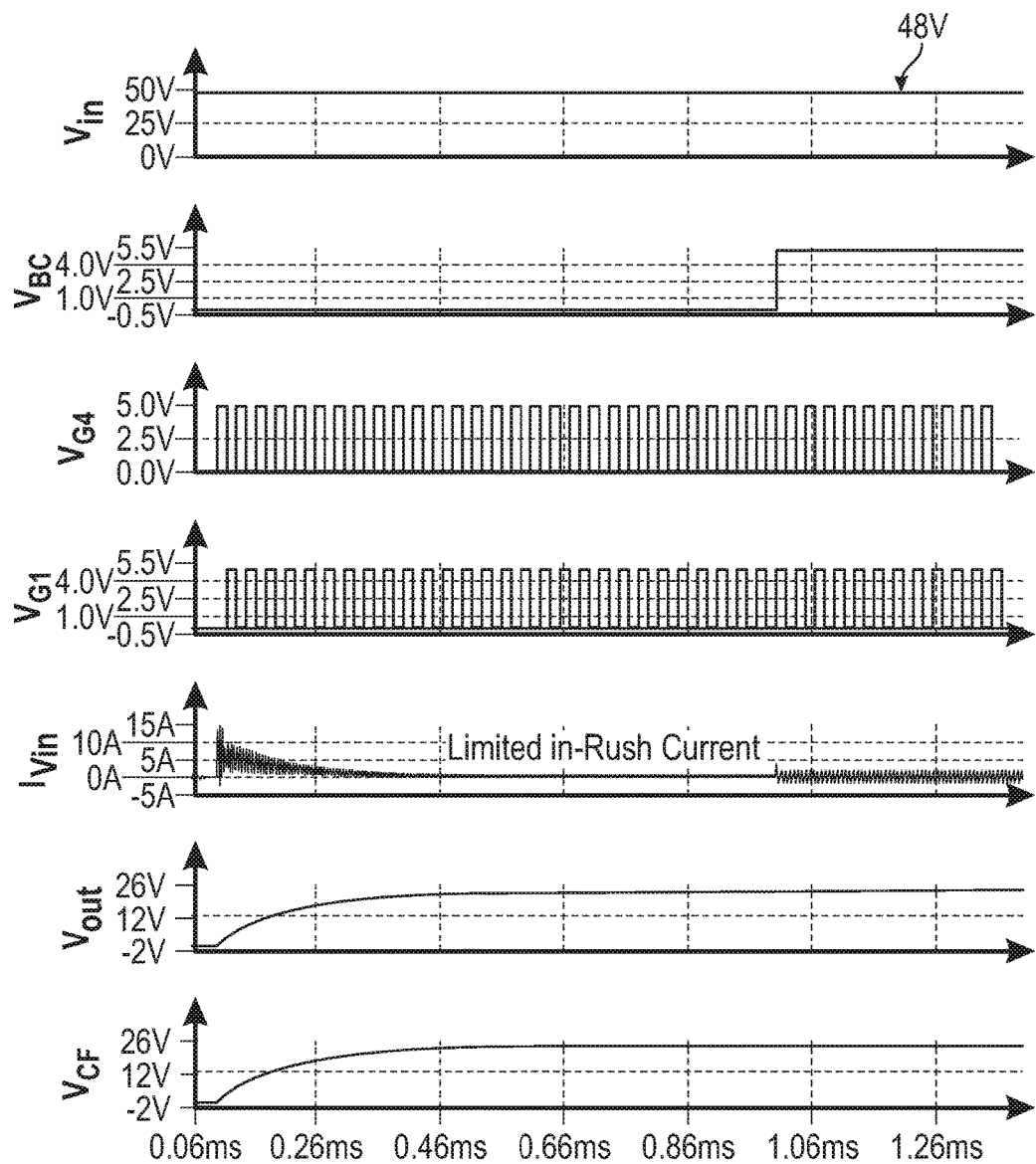
FIG. 24 illustrates exemplary control signals and results obtained in simulations applying the control signals to a model of a soft starting switched capacitor converter of FIG. 23.

FIG. 24 illustrates exemplary control signals and results obtained in simulations applying the control signals to a model of the SCSC converter of FIG. 23. Bypass control signal is shown being held low (e.g., switched off) during soft-charging mode of the converter.

Figure 25A:
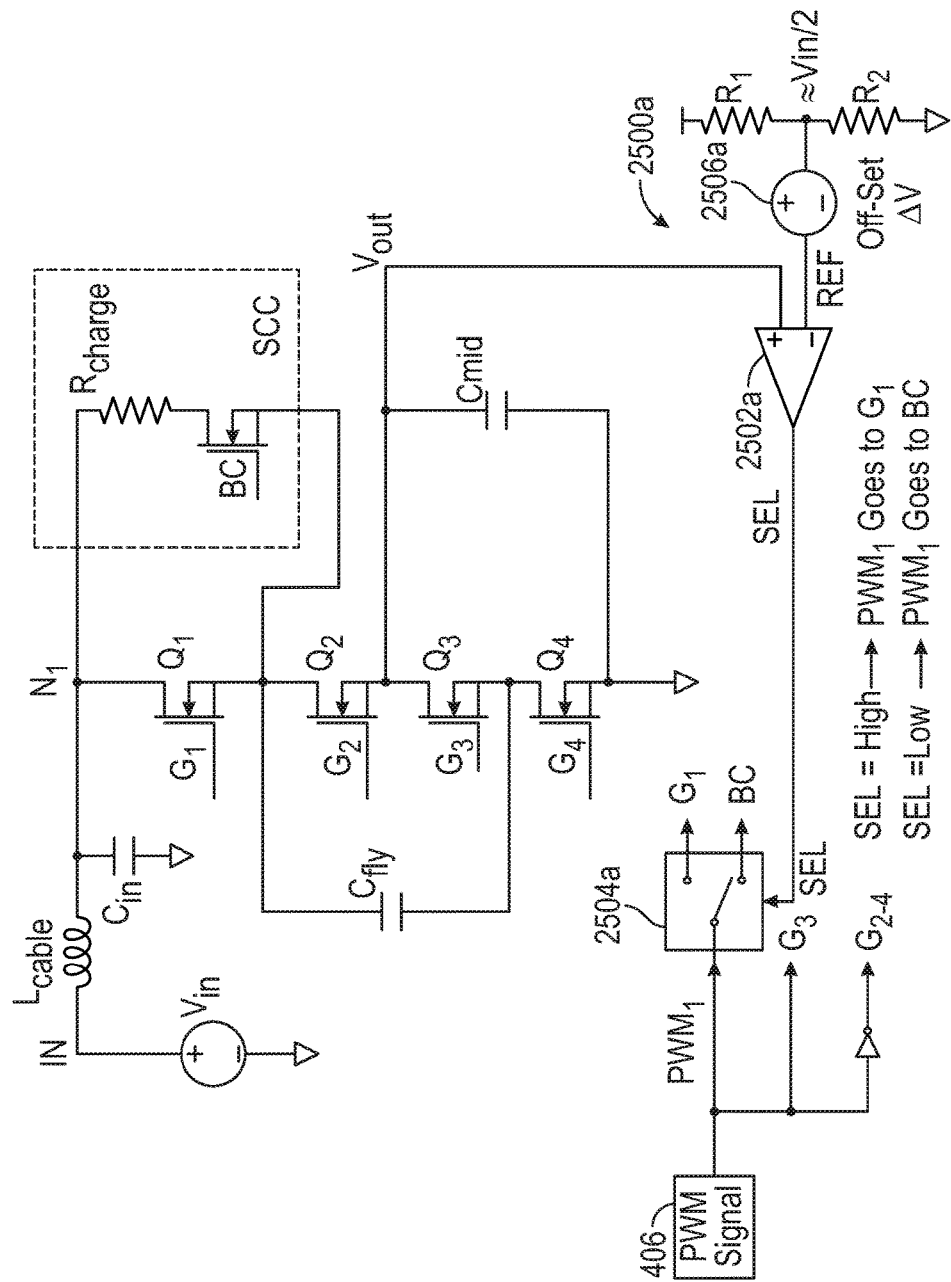
FIGS. 25A and 25B illustrate first and second exemplary selection circuits, respectively, for selecting between a first converter state in which a main switching transistor is deactivated and an auxiliary soft-charge bypass circuit is activated, and a second converter state in which the auxiliary soft-charge bypass circuit is deactivated and the main switching transistor is activated.

FIG. 25A illustrates a first exemplary selection circuit 2500a, including a comparator 2502a and a multiplexer 2504a, for selecting between a first converter mode in which a main switching transistor is deactivated and an auxiliary soft-charge bypass circuit is activated, and a second converter mode in which the auxiliary soft-charge bypass circuit is deactivated and the main switching transistor is activated, according to various implementations described herein.

For exemplary purposes, selection circuit 2500a of FIG. 25 is depicted as being implemented in the SCSC converter 400 of FIG. 4. Selection circuit 2500, without limitation, may be implemented in any converter circuit described herein. In the depicted example, the comparator 2502a compares the output voltage Vout with an expected reference value REF. According to various implementations, the reference value REF is set to a value representative of when the converter should be switched from the first converter state to the second converter state, when soft-charging of the output capacitor is completed.

The switching control circuit 406 generates one or more switching signals. In the depicted example, a single output signal is provided from which all signals are generated. G1 and G3 are complementary to G2 and G3. Accordingly, signals G2 and G4 are generated by the application of an inverter to the output signal. The multiplexer 2504a receives one or more switching signals from soft-charging switching control circuit 406 and, based on a selection signal, directs the signal(s) to corresponding default switching transistors (e.g., switching transistor 408-1) or corresponding bypass transistor(s) 416. In the depicted example, the multiplexer 2504 receives G1 (relabeled PWM 1), rerouting it to bypass transistor 416 when the auxiliary bypass soft-charging circuit is activated.

In the depicted example, the reference value REF is set to Vin/2. The reference value is set by dividing Vin between a first resistor R1 and a second resistor R2, and is then provided to the reference input REF of comparator 2502a. An offset circuit 2506a can be provided to offset the divided voltage by a ΔV to ensure that the output capacitor is charged to the desired amount of charge. In the depicted example, the comparator 2502a compares the switched capacitor converter (voltage divider) Vout with Vin/2, and provides a selection signal SEL to multiplexer 2504a. If the Vout is higher than Vin/2−ΔV (a small offset), it indicates the end of the pre-charging mode and multiplexer 2504a directs an input PWM1 signal to G1 to activate the main switching transistor Q1. Before that, G1 can be disabled and PWM1 signal directed to BC (bypass control) to activate Q5.

According to various implementations, selection circuit 2500a can also detect a trigger event to switch the converter from the first converter mode in which the main switching transistor is deactivated and the auxiliary soft-charge bypass circuit is activated, and the second converter mode in which the auxiliary soft-charge bypass circuit is deactivated and the main switching transistor is activated. For example, a fast input voltage transient at Vin will cause the reference voltage REF to change, creating a Vout<Vin/2−ΔV condition, and cause comparator 2502a to force SEL low. Multiplexer 2504 can then respond to a quick change at Vin by directing the input PWM1 signal to BC to activate Q5 and disable G1. At power up, a Vout<Vin/2−ΔV condition will also cause BC to be enabled and G1 disabled.

Figure 25B:
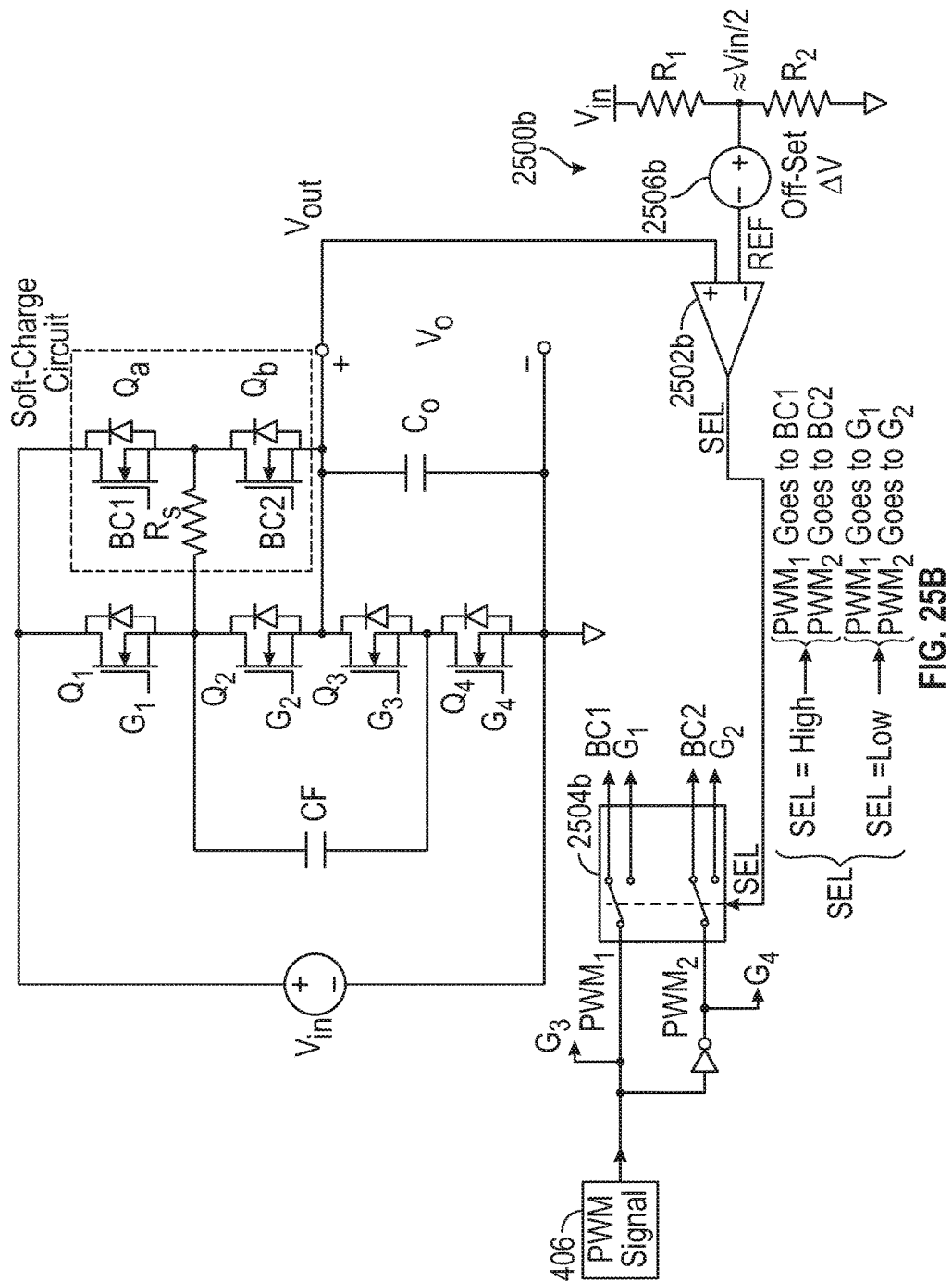

FIG. 25B illustrates a second exemplary selection circuit 2500b, including a comparator 2502b and a multiplexer 2504b, according to various implementations described herein. For exemplary purposes, selection circuit 2500b of FIG. 25 is depicted as being implemented in the SCSC converter 800 of FIG. 8B. Selection circuit 2500b, without limitation, may be implemented in any converter circuit described herein. The selection circuit 2500b of FIG. 25B operates in substantially the same way as the selection circuit 2500a of FIG. 25A, with the exception that the two switching signals (e.g., G1 and G2) are rerouted.

Those of in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 26:
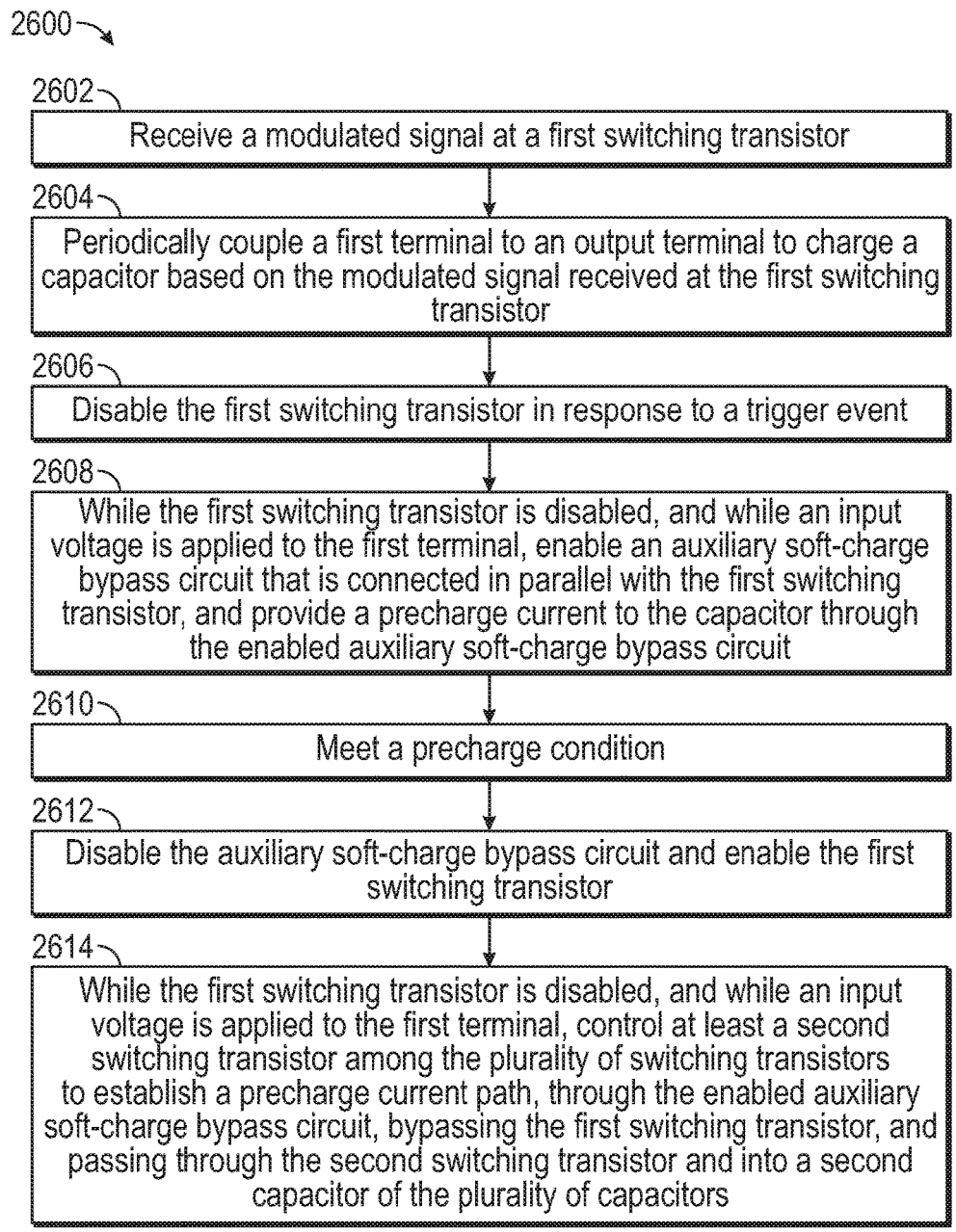
FIG. 26 is a flowchart of an exemplary process for reducing in-rush current across switching transistors in a switched capacitor converter circuit.

FIG. 26 is a flowchart of an exemplary process for reducing in-rush current across switching transistors in a switched capacitor converter circuit, according to various implementations described herein. For explanatory purposes, the various blocks of exemplary process 2600 are described herein with reference to FIGS. 1-25, and the components and/or processes described herein. The one or more of the blocks of process 2600 may be implemented, for example, by any of the various switched capacitor converter circuits described herein. In some implementations, one or more of the blocks may be implemented apart from other blocks, and by one or more different processors or devices. Further for explanatory purposes, the blocks of exemplary process 2600 are described as occurring in serial, or linearly. However, multiple blocks of exemplary process 2600 may occur in parallel. In addition, the blocks of exemplary process 2600 need not be performed in the order shown and/or one or more of the blocks of exemplary process 2600 need not be performed.

In the depicted exemplary flow diagram, a modulated signal is received at a first switching transistor (2602) and, in response, periodically coupling a first terminal to an output terminal to charge a capacitor (2604). The first switching transistor is disabled in response to a trigger event (2606). As described previously, the trigger event may include a power-up of the converter circuit or detection of a fast input voltage transient at the first terminal.

While the first switching transistor is disabled, and while an input voltage is applied to the first terminal, an auxiliary soft-charge bypass circuit that is connected in parallel with the first switching transistor is enabled, and a precharge current to the capacitor through the enabled auxiliary soft-charge bypass circuit is provided (2608). In the depicted example, a precharge condition is met (2610). As described previously, the precharge condition can include the output capacitor (or other capacitor in the circuit) meeting a threshold charge. The precharge condition may be detected, for example, by a comparator 2502 connected to Vout of the circuit. Upon meeting a precharge condition, disabling the auxiliary soft-charge bypass circuit is disabled and the first switching transistor is enabled (2612).

According to various implementations, the first switching transistor can be within a network of a plurality of switching transistors that switchably interconnect a plurality of capacitors. In these implementations, the capacitor can be a first capacitor among the plurality of capacitors. In the depicted example, while the first switching transistor is disabled, and while an input voltage is applied to the first terminal, at least a second switching transistor among the plurality of switching transistors is controlled to establish a precharge current path, through the enabled auxiliary soft-charge bypass circuit, bypassing the first switching transistor, and passing through the second switching transistor and into a second capacitor of the plurality of capacitors (2614).

Figure 27:
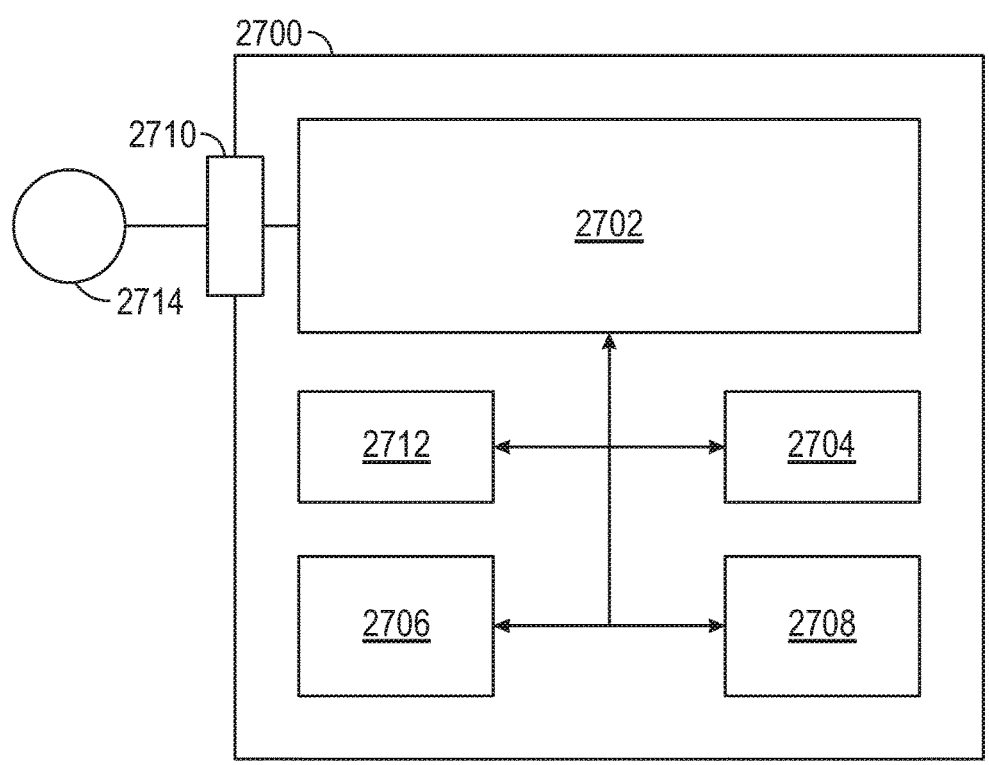
FIG. 27 is a diagram of an exemplary electronic system that implements a soft-charging switched capacitor converter circuit.

FIG. 27 is a diagram of an exemplary electronic system 2700 that implements a soft-charging switched capacitor converter circuit, according to various implementations described herein. Electronic system 2700, in combination with the disclosure regarding FIGS. 1-26, may be any electronic device utilizing power from a power source. For example, electronic system 2700 may be representative of a computing device (e.g., a personal computer or a mobile device such as a smartphone, tablet computer, laptop, PDA, a wearable such as a watch or band, or combination thereof), or a consumer appliance, television or other display device, radio or telephone, home audio system, a device or power converter for communication and/or data processing system(s), a device or power converter for automotive system(s), or the like.

In some implementations, electronic system 2700 may include a power delivery device 1002 (e.g., a power supply) and a load. The load may include various components of the electronic system 2700, including one or more of a central processing unit (CPU) 2704, various memory systems 2706, one or more input and/or output (I/O) devices 2708, a power interface 2710, and one or more batteries 2712. The CPU 2704 can be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

A memory system 2706 can include, for example, volatile memory used to temporarily store data and information used to manage electronic system 2700, random access memory (RAM), non-volatile memory such as a magnetic disk, flash memory, peripheral SSD, and the like. I/O device 2708 may include an input device such as a keyboard, a touch screen, a touch pad, voice control system, or other device for input of data. I/O device 2708 may include an output device such as a display device, audio device (e.g., a speaker), or data interface (e.g., a host data bus) for output of data. In some implementations, one or more elements of electronic system 2700 can be integrated into a single chip. In some implementations, the elements can be implemented on two or more discrete components.

The power delivery device 2702 can include any of the previously described SCSC converter circuits (including an auxiliary bypass circuit), including a corresponding soft-charging switching control circuit. Accordingly, the power delivery device 2702 can be configured (e.g., as a step up or step down converter) to convert a first voltage to a second voltage, different than the first voltage. The power delivery device 2702 can receive an input power (e.g., at a voltage Vin) from an external power source 2714 via power interface 2710. The input power can be a DC power. In some implementations, the input power can be an alternating current source that is converted to a DC (e.g., by power interface 2710) before being utilized by power delivery device 2702. Additionally or in the alternative, the input power can be DC from battery 2712.

The power delivery device 2702 can produce a voltage according to the load requirements of the various components of electronic device 2700. In this regard, power delivery device 2700 can implement multiple different types of converter circuits to accommodate different load requirements of the various components of electronic device 2700. Additionally or in the alternative, the power delivery device 2702 can be configured to provide charge to the battery 2712 (e.g., as part of a battery charger system) based on power from external power source 2714.

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the present disclosure, and the present disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a circuit or processor configured to monitor and control an operation or a component may also mean the circuit or processor being programmed to monitor and control the operation or being operable to monitor and control the operation. Likewise, a circuit or processor configured to execute code may be construed as a circuit or processor programmed to execute code or operable to execute code.

The phrases "in communication with" and "coupled" mean in direct communication with or in indirect communication with via one or more components named or unnamed herein (e.g., a memory card reader)

A phrase such as an "aspect" does not imply that such aspect is essential to the present disclosure or that such aspect applies to all configurations of the present disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the present disclosure or that such implementation applies to all configurations of the present disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the present disclosure or that such configuration applies to all configurations of the present disclosure. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example, instance, or illustration." Any aspect described herein as "exemplary" is not necessarily to be construed as preferred or advantageous over other aspects. In addition, description of a feature, advantage or mode of operation in relation to an example combination of aspects does not require that all practices according to the combination include the discussed feature, advantage or mode of operation.

As used herein, the singular forms "a", "an" and "the" are intended to include the plural forms as well, unless the context clearly indicates otherwise. Numeric terms such as "first", "second", "third," etc., unless specifically stated, are not used herein to imply a particular ordering of the recited structures, components, capabilities, modes, steps, operations, or combinations thereof with which they are used.

The terms "comprise," "comprising," "includes," and "including", as used herein, specify the presence of one or more recited structures, components, capabilities, modes, steps, operations, or combinations thereof, but do not preclude the presence or addition of one or more other structures, components, capabilities, modes, steps, operations, or combinations thereof.

What is claimed is:

1. A switched capacitor power converter, comprising:
   a plurality of capacitors;
   a plurality of switching transistors arranged to, when switched according to a switching cycle, charge the plurality of capacitors from a voltage source and discharge the plurality of capacitors to provide regulated power to a load;
   an auxiliary soft-charge bypass circuit comprising one or more auxiliary transistors and an impedance element, and providing an auxiliary circuit path parallel to a first switching transistor of the plurality of switching transistors through the impedance element to charge the plurality of capacitors when the auxiliary soft-charge bypass circuit is activated and the first switching transistor is deactivated; and
   a control circuit configured to switch to (1) an operational mode in which the auxiliary soft-charge bypass circuit is deactivated and the plurality of switching transistors are switched according to the switching cycle, from (2) a soft-charging mode in which the auxiliary soft-charge bypass circuit is activated and the first switching transistor is deactivated, and the one or more auxiliary transistors are switched according to the switching cycle in place of one or more of the plurality of switching transistors.

2. The switched capacitor power converter of claim 1, wherein the control circuit is configured to switch to the soft-charging mode in response to a power-up of the converter or a fast input voltage transient from the voltage source, and to switch to the operational mode when a respective capacitor of the plurality of capacitors reaches a threshold charge.

3. The switched capacitor power converter of claim 2, wherein the impedance element is a resistor or inductor, and wherein, when the control circuit is in the soft-charging mode, the plurality of capacitors are switched between being connected in parallel with each other, and being connected in series with the resistor or inductor between the voltage source and a ground.

4. The switched capacitor power converter of claim 3, wherein the plurality of switching transistors are connected in series between the voltage source and the ground, and wherein the plurality of capacitors comprise an output capacitor connected to the load at a node linking two of the plurality of switching transistors, and wherein the regulated power provided to the load is based on a division of a voltage of the voltage source.

5. The switched capacitor power converter of claim 3, wherein the plurality of switching transistors are connected in series between the load and the ground, and wherein the plurality of capacitors comprises an output capacitor connected to the load, and wherein the regulated power provided to the load is based on a multiple of a voltage of the voltage source.

6. The switched capacitor power converter of claim 3, further comprising:
   a flying inductor,
   wherein the flying inductor is connected in series with two of the plurality of capacitors when the plurality of switching transistors are switched.

7. The switched capacitor power converter of claim 2, wherein the one or more auxiliary transistors comprise first and second auxiliary transistors connected in series, the control circuit switching the second auxiliary transistor during the soft-charging mode complementary to the switching of the first auxiliary transistor and in place of a second switching transistor of the plurality of switching transistors.

8. The switched capacitor power converter of claim 7, wherein the impedance element is connected between a first node linking the first and second auxiliary transistors and a second node linking the first and second switching transistors.

9. The switched capacitor power converter of claim 7, wherein the auxiliary soft-charge bypass circuit further comprises:
   a second impedance element in series with the second auxiliary transistor to, when the auxiliary soft-charge bypass circuit is activated and the second switching transistor is deactivated, provide a second circuit path through the second impedance element and in parallel to the second switching transistor to buffer current flow between the plurality of capacitors.

10. A system, comprising:
a power supply comprising a switched capacitor power converter, wherein the switched capacitor power converter comprises:
   a plurality of capacitors in a first circuit;
   a first plurality of switching transistors in the first circuit which, when activated, connects the plurality of capacitors in series;
   a second plurality of switching transistors arranged in the first circuit which, when activated, connects the plurality of capacitors in parallel, wherein a first switching transistor of the first plurality of switching transistors or a second switching transistor of the second plurality of switching transistors, when activated, provides a default circuit path to at least one of the plurality of capacitors;
   an auxiliary soft-charge bypass circuit comprising an impedance element and providing, when activated, an alternative path through the impedance element to the at least one of the plurality of capacitors; and
   a control circuit configured to switch between (1) a soft-charging mode in which the alternative path is periodically activated while the default switching path is deactivated, and (2) an operational mode in which the default switching path is periodically activated while the alternative path is deactivated, to charge the plurality of capacitors from a voltage source and discharge the plurality of capacitors to provide regulated power to a load.

11. The system of claim 10, wherein the control circuit is configured to switch to the soft-charging mode in response to a power-up of the system or to a fast input voltage transient at the voltage source, and to switch to the operational mode when a charge on a respective capacitor of the plurality of capacitors reaches a threshold charge.

12. The system of claim 11, wherein the impedance element comprises a resistor or inductor, and wherein, when in the soft-charging mode, the plurality of capacitors are switched between being connected in parallel with each other, and connected in series with the resistor or inductor between the voltage source and a ground.

13. The system of claim 12, wherein the plurality of switching transistors are connected in series between the voltage source and the ground, and wherein the plurality of capacitors comprises an output capacitor connected to the load at a node linking two of the plurality of switching transistors, and wherein the regulated power provided to the load comprises a division of a voltage potential of the voltage source.

14. The system of claim 12, wherein the plurality of switching transistors are connected in series between the load and the ground, and wherein the plurality of capacitors comprises an output capacitor connected to the load, and wherein the regulated power provided to the load comprises a multiple of a voltage potential of the voltage source.

15. The system of claim 12, further comprising:
a flying inductor,
wherein the flying inductor is connected in series with two of the plurality of capacitors when the plurality of switching transistors are periodically switched.

16. The system of claim 12, wherein the auxiliary soft-charge bypass circuit comprises first and second auxiliary transistors connected in series, the control circuit switching the first and second auxiliary transistors complementary to each other during the soft-charging mode, in place of the first and second switching transistors.

17. The system of claim 16, wherein the resistor or inductor is connected between a first node linking the first and second auxiliary transistors and a second node linking the first and second switching transistors.

18. The system of claim 16, wherein the auxiliary soft-charge bypass circuit further comprises:
a second resistor or inductor in series with the second auxiliary transistor to, when the auxiliary soft-charge bypass circuit is activated and the second switching transistor is deactivated, provide a second circuit path through the second resistor or inductor and in parallel to the second switching transistor to buffer current flow between the plurality of capacitors.

19. A switched capacitor power converter, comprising:
means for establishing a default switching path between a voltage source and a load, to provide regulated power to the load based on a switching cycle;
means for providing an auxiliary switching path through an impedance element, parallel to a portion of the default switching path, to charge one or more capacitors in the default switching path based on the switching cycle; and
means for switching between a soft-charging mode in which the auxiliary switching path is enabled and the default switching path is disabled, and an operational mode in which the auxiliary switching path is disabled and the default switching path is enabled, the auxiliary switching path being enabled in response to a power-up of the converter or to a fast input voltage transient from the voltage source, and the default switching path being switched to enabled when charge on the one or more capacitors reaches a threshold charge.

20. The switched capacitor power converter of claim 19, wherein the default switching path comprises a plurality of switching transistors, and wherein the means for providing the auxiliary switching path comprises:
means, operative during the soft-charging mode, for switching a plurality of auxiliary transistors in place of the plurality of switching transistors.

* * * * *